United States Patent [19]
Suzuki et al.

[11] Patent Number: 6,107,570
[45] Date of Patent: Aug. 22, 2000

[54] WIRING HARNESS ARRANGING CONSTRUCTION

[75] Inventors: Masahisa Suzuki; Tetsuya Takimoto; Yasuhiro Ando; Tetuya Funaki; Shinichi Suehiro, all of Yokkaichi, Japan

[73] Assignee: Sumitomo Wiring Systems, Ltd., Japan

[21] Appl. No.: 09/334,076

[22] Filed: Jun. 16, 1999

Related U.S. Application Data

[62] Division of application No. 08/871,494, Jun. 9, 1997, Pat. No. 5,994,645.

[30] Foreign Application Priority Data

Jun. 14, 1996 [JP] Japan ..................................... 8-154379
Jun. 27, 1996 [JP] Japan ..................................... 8-167960
Dec. 26, 1996 [JP] Japan ..................................... 8-348860

[51] Int. Cl.[7] .............................. H01B 7/06; H01B 7/00
[52] U.S. Cl. ...................... 174/72 A; 174/69; 174/72 C; 174/72 R
[58] Field of Search ................................ 174/72 A, 71 R, 174/72 C, 72 R, 69, 135; 191/23, 12 R, 12.2 R; 296/146.7

[56] References Cited

U.S. PATENT DOCUMENTS

| | | | |
|---|---|---|---|
| 1,637,059 | 7/1927 | Simmons | 439/448 |
| 2,184,363 | 12/1939 | Schultz et al. | 137/355.28 |
| 3,909,047 | 9/1975 | Salmela | 285/119 |
| 4,006,952 | 2/1977 | Puckett | 439/4 |
| 4,337,596 | 7/1982 | Kern et al. | 49/210 |
| 4,992,629 | 2/1991 | Morais | 174/69 |
| 5,164,546 | 11/1992 | Kumagai | 174/135 |
| 5,466,036 | 11/1995 | Stroeters et al. | 296/208 |
| 5,521,806 | 5/1996 | Hutzel et al. | 362/486 |
| 5,556,059 | 9/1996 | Maeda et al. | 248/49 |
| 5,879,047 | 3/1999 | Yamaguchi et al. | 296/146.7 |
| 5,921,782 | 7/1999 | Yamaguchi et al. | 439/34 |

FOREIGN PATENT DOCUMENTS

| | | |
|---|---|---|
| 2 616 390 | 12/1988 | France . |
| 2 662 552 | 11/1991 | France . |
| 42 21 976 | 1/1994 | Germany . |
| 63-32527 | 8/1988 | Japan . |
| 8-48146 | 2/1996 | Japan . |

*Primary Examiner*—Kristine Kincaid
*Assistant Examiner*—Mark Olds
*Attorney, Agent, or Firm*—Anthony J. Casella; Gerald E. Hespos; Michael J. Porco

[57] ABSTRACT

There is provided a guide frame 10 having a small width and a triangular or other shape. An insertion opening 10e and a withdrawal opening 10g for a wiring harness D·W/H are formed in spaced-apart positions of the guide frame 10. The wiring harness D·W/H is fixedly inserted through the insertion opening 10e of the guide frame 10 and withdrawn through the withdrawal opening 10g after being arranged in a roundabout manner inside the guide frame 10. The guide frame 10 is fixed to either one of a door D and a body C, and the leading end of the wiring harness D·W/H withdrawn from the guide frame 10 through the withdrawal opening 10g is extended to the other of the door D and the body C, so that the wiring harness D·W/H comes from and returns into the guide frame 10 according to opening and closing movements of the door D.

9 Claims, 23 Drawing Sheets

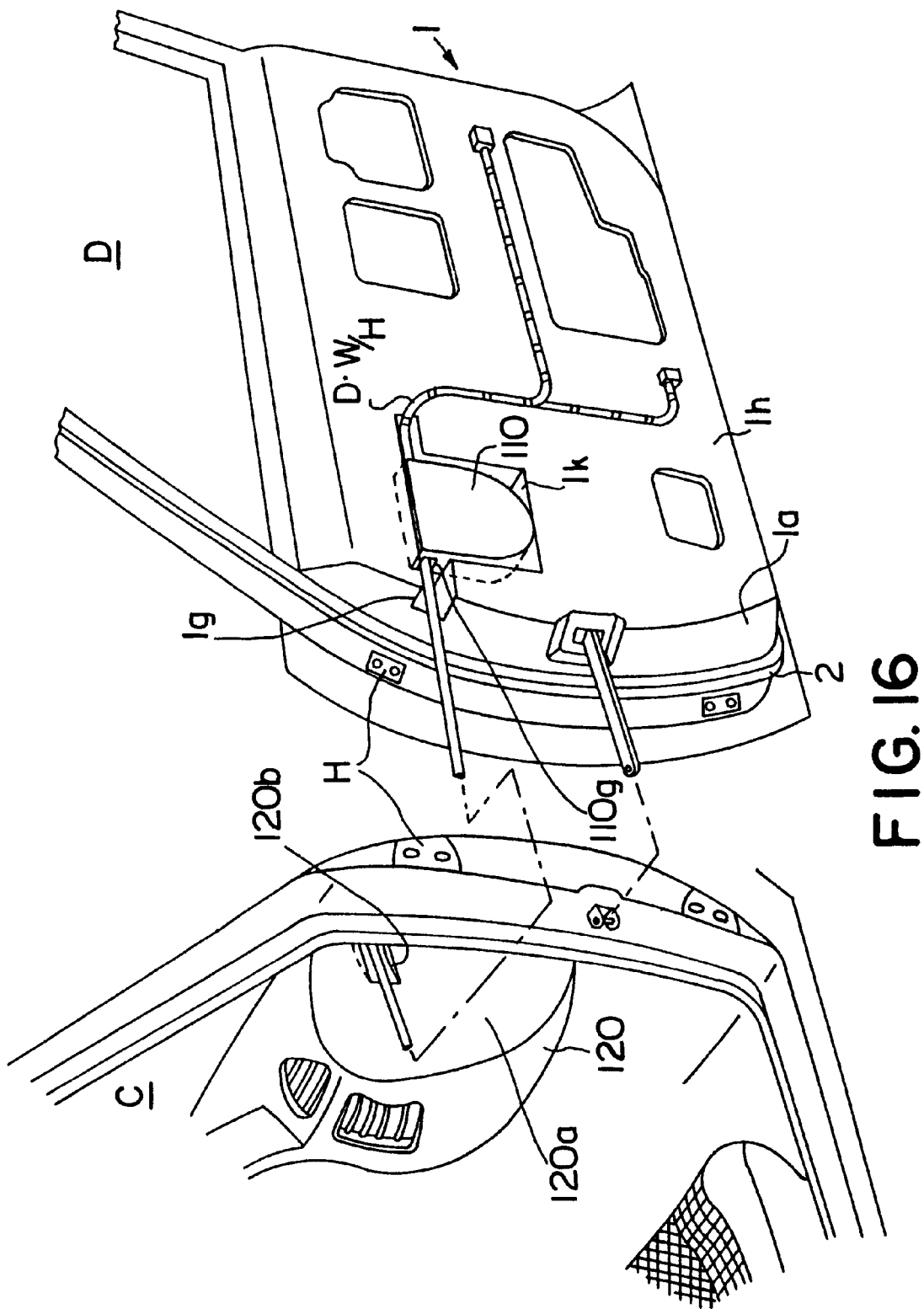

(DOOR OPEN) (DOOR CLOSED)

WIRING HARNESS ARRANGING CONSTRUCTION

CROSS-REFERENCE TO RELATED APPLICATION

This application is a divisional of Application Ser. No. 08/871,494, filed Jun. 6, 1997 now U.S. Pat. No. 5,994,645.

BACKGROUND OF THE INVENTION

1. Field of the Invention

The present invention relates to a device or construction for arranging a wiring harness in a door hinge portion of a vehicle and is particularly designed to facilitate an operation and prevent the entrance of water.

2. Description of the Prior Art

A door hinge connects a body and a door of a vehicle to permit opening and closing of the door. A prior door harness may be arranged from a door side to a body side and may be connected with an instrument panel harness (hereinafter, "IP harness") at the body side. Alternatively, the prior art IP harness may be arranged from the body side to the door side and may be connected with the door harness at the door side.

Conventionally, in the door hinge portion, the door harness is arranged in substantially the same position as a hinge point along the horizontal direction, but is displaced therefrom along the vertical or height direction. Thus the prior art door harness only twists without extending or contracting as the door is opened and closed. The above twisting is taken up by the twisting of the wiring harness.

A prior art door harness with a wiring harness arranged at the hinge point is shown in FIGS. 29 and 30. In this prior art, a hinge H for connecting a body C and a door D is mounted substantially in the middle of an end surface 1a of a door panel 1. A door harness D·W/H is arranged inside the door panel 1 and is taken outside the door D through a through hole 1b formed in the end surface 1a. It takes time and labor to arrange the wiring harness inside the door panel 1 and pass it through the through hole 1b.

Further, a weatherstrip 2 is mounted on the door D to prevent the entrance of water. Since the weatherstrip 2 is mounted more toward the passenger compartment than the hinge H, the wiring harness D·W/H is located more away from the passenger compartment than the weatherstrip 2. Accordingly, the weatherstrip 2 cannot fulfill its water preventing function at the location where the wiring harness is arranged, necessitating a water preventing construction for the wiring harness D·W/H. In view of this, a conventional practice has been such that waterproof grommets are mounted on the holes formed in the body C and the door D for the arrangement of the wiring harness D·W/H and a certain measure is taken to make the wiring harness D·W/H waterproof. However, such a practice is costly and cumbersome.

The above problem can be solved by arranging the wiring harness D·W/H more toward the passenger compartment than the weatherstrip 2. However, in such a case, the position of the wiring harness D·W/H is displaced from the hinge point along the horizontal direction. Thus the wiring harness D·W/H needs to be extended and contracted when the door D is opened and closed. In other words, the wiring harness to be arranged in the door hinge portion is required to have both an extendible/contractible function and a twist take-up function.

A construction in which a wiring harness is arranged more toward the passenger compartment than a weatherstrip is disclosed in Japanese Unexamined Patent Publication No. 8(HEI)-48146. Specifically, as shown in FIGS. 31 and 32 of that reference, a corrugated duct 4 for covering an air conditioning duct is mounted between a side cover 3 of an instrument panel and an inner surface 1c of a door opposite to the side cover 3, and a wiring harness D·W/H that is spirally to have a margin length is arranged inside this duct 4.

However, since the spiral wiring harness D·W/H is arranged inside the corrugated duct 4 in the above construction, several problems may occur. For example, when the wiring harness D·W/H extends in the center of the corrugated duct 4 as shown in FIGS. 33(A) and 33(B), the corrugated duct 4 and the spiral wiring harness D·W/H are allowed to extend and contract in a normal manner. However, if a part W of the wiring harness D·W/H enters a recess 4a of the corrugation of the duct 4 as shown in FIG. 34(A), the duct 4 cannot contract. If the door is closed in this state as shown in FIG. 34(B), the duct 4 and the wiring harness D·W/H may be damaged by being jammed between the door panel 1 and the side cover 3 and, in a worst case, the wire may be cut. Additionally, the spiral wiring harness D·W/H is not necessarily constantly restored to its specific configuration after the extension or contraction. If the outer diameter of the wiring harness becomes larger than the inner diameter of the corrugated duct 4, the corrugated duct 4 is destroyed and cannot contract any longer. Furthermore, the corrugated duct 4 is exposed to the passenger compartment, and may be deformed by an external force. In such a case, the spiral wiring harness D·W/H located inside may enter the recess 4a of the duct 4, and accordingly may be jammed between the door panel 1 and the side cover 3 as described above. Finally, when the door D is opened and closed, a force to extend and contract the corrugated duct 4 is needed in addition to a door opening/closing force, disadvantageously making the door heavier for a driver or passenger to open and close it.

To overcome the above problems, it is an object of the present invention to provide a wiring harness arranged at a radial distance from a rotation point of first and second elements that are rotatable and/or movable with respect to each other, and in a position which is more toward a passenger compartment than a hinge point and preferably more inward than a weatherstrip, to facilitate an operation and to prevent the entrance of water.

SUMMARY OF THE INVENTION

According to the invention, there is provided a wiring harness arranging device for arranging a wiring harness that will extend between a first element and a second element that are movable and/or rotatable with respect to each other. For example the wiring harness may extend between a vehicle body and a door in a position more toward a passenger compartment than a mount position of a hinge that connects the vehicle body and the door. Preferably the wiring harness and the arranging device are more toward the passenger compartment than a weatherstrip is. The arranging device comprises at least one wiring harness dispensing or feeding or holding means in which an insertion opening and a dispensing or withdrawal opening for a wiring harness are formed in spaced-apart positions. The wiring harness is inserted through the insertion opening and dispensed or withdrawn through the dispensing opening. At least one wiring harness dispensing means is fixed to either one of or both the first and second element, in particular to a door and a vehicle body. The leading end of the wiring harness is dispensed from the at least one wiring harness dispensing means through the dispensing opening and is extended to the other of the first and second elements, in particular the door or the vehicle body, so that the wiring harness comes from and returns into the at least one wiring harness dispensing means according to the movement and/or rotation of the first and second elements with respect to each other, in particular according to the opening and closing movements of the door.

Thus the wiring harness dispensing or feeding means accommodates a loosened portion of the wiring harness thus compensating for a need of wiring harness when the first and second elements are displaced with respect to each other in a manner that enlarges the distance between the positions were the wiring harness is fixed to the first and second elements. In other words the wiring harness feeding means provides a loosened length of the wiring portion which allows a movement of the first and/or second elements without stretching or breaking the wiring harness and allows for a contraction or extension of the wiring harness in accordance with a movement and/or rotation of the first and/or second element with respect to each other.

Accordingly the wiring harness arranging construction allows for an arrangement of the wiring harness in such a manner as to have both a bent or twist take-up function and an extendible/contractible function.

According to a preferred embodiment of the invention, the wiring harness is fixedly inserted through the insertion opening.

Preferably, the wiring harness is inserted into the wiring harness dispensing means through the insertion opening and dispensed or withdrawn through the dispensing opening after being arranged in a substantially roundabout manner.

Further preferably, the wiring harness dispensing means comprises a guide frame having a substantially triangular shape, the insertion opening is provided at a first apex thereof, the dispensing opening is provided at a second apex thereof, and the wiring harness is so accommodated in the guide frame as to extend preferably in a substantially roundabout manner, preferably toward a third apex.

Most preferably, the wiring harness dispensing means, in particular the guide frame is fixedly and vertically accommodated in a recess formed in an end surface of the second element, in particular the door, an inner surface of the door toward a passenger compartment, an end surface of the first element, in particular of the vehicle body facing the end surface of the door, or an end surface of an instrument panel toward the door.

According to a further preferred embodiment, the at least one wiring harness dispensing means has an open rear surface or has a boxlike shape with a small width. Preferably the dispensing means is formed with a locking claw to be detachably locked with an engaging groove formed in the first element and/or the second element, in particular in the door and/or the vehicle body. The wiring harness preferably is slidably accommodated in a space defined between an open front surface of the wiring harness dispensing means and first and/or second element in particular the door and/or the vehicle body in embodiments where the case of the wiring harness dispensing means has an open rear surface. Alternatively the wiring harness may be slidably accommodated substantially inside the wiring harness dispensing means in the case of the box-shaped wiring harness dispensing means.

Preferably, one or more tubular portions project at the insertion and/or dispensing openings of the wiring harness dispensing means and/or wherein the insertion opening, in particular the tubular portion thereat, and the wiring harness are preferably fixed by fixing means, in particular by taping or clamping.

Still further preferably, the wiring harness is passed through a restricting tube having open opposite ends. The tube then is placed at least partially inside the wiring harness dispensing means in a position substantially continuous with the dispensing opening so as to be slidable, preferably substantially in and out of the dispensing opening, wherein the wiring harness is preferably tightly passed through or fixed to the restricting tube so that the restricting tube moves together with the wiring harness. A biasing means, such as a spring, preferably is provided between the restricting tube and the wiring harness dispensing means to bias the wiring harness in a direction to pull it into the wiring harness dispensing means.

Most preferably, the wiring harness dispensing means, in particular the guide frame is fixed to the door and the wiring harness is arranged by inserting the leading end of the wiring harness having passed through the wiring harness dispensing means into an opening formed in an end surface of an instrument panel toward the door or a lower surface thereof at the door side.

According to still a further preferred embodiment, the wiring harness dispensing means comprises a container casing having a space for accommodating the wiring harness while being looped, so that the wiring harness passed through the container casing can extend and contract while varying the diameter of the loop as the first and/or second elements are moved and/or rotated with respect to each other, in particular the door is opened and closed. Preferably at least a portion of the wiring harness to be passed through or inserted into the wiring harness dispensing means is passed through or fitted into a tube having a smooth outer surface and a function of restoring to an original looped state with a large diameter. Thus the wiring harness withdrawn or dispensed when the first and second elements are moved and/or rotated with respect to each other, in particular when the door is opened, is pulled back into the wiring harness dispensing means due to the restoring force of the tube, returning to the original looped state with the large diameter when the first and second elements are in their first position, in particular when the door is closed.

Further preferably, a stopper projection is provided preferably inside the container casing, and the wiring harness is accommodated while being looped at least once about the stopper projection so that, while the wiring harness is dispensed or fed or withdrawn from the container casing, any further dispensing or feeding or withdrawal of the wiring harness is stopped when the wiring harness substantially winds around the stopper projection.

Most preferably, the insertion and dispensing openings are substantially opposed to each other.

According to still a further preferred embodiment, the container casing comprises a main body and a lid which preferably is formed integrally or unitarily with the main body via a thin hinge. The main body may comprise an arcuate, preferably substantially semicircular bottom portion, a flat upper surface provided at the upper end of the bottom portion, and an arcuate side wall. The lid preferably has a substantially semicircular shape and may be connected with the leading end of the upper surface via the hinge. The insertion and dispensing openings for the wiring harness may be formed at the opposite ends of the side wall near the upper surface so as to be substantially opposed to each other. A lock portion may be provided between the lid and the main body.

At least one partition plate may be provided inside the container casing to define at least a space communicating with the insertion opening and a space communicating with the dispensing opening lest portions of the wiring harness dispensed through the dispensing opening after being inserted through the insertion opening and looped at least once should directly intersect.

Further preferably, the partition plate is arranged at a mount step of the stopper projection and/or wherein an edge of the partition plate is rounded off.

Most preferably, the distance of the stopper projection from an edge of the partition plate is variable along a direction of the loop of the wiring harness or a circumferential or azimuthal direction.

According to a preferred embodiment of the invention, there is provided a wiring harness arranging device for arranging a wiring harness that will extend between a vehicle body and a door in a position more toward a passenger compartment than either a weatherstrip or a mount position of a hinge for connecting the vehicle body and the door. The wiring harness arranging device comprises a guide frame which has a small width and in which an insertion opening and a withdrawal opening for a wiring harness are formed in spaced-apart positions. The wiring harness is fixedly inserted through the insertion opening of the guide frame and withdrawn through the withdrawal opening after being arranged in a roundabout manner. The guide frame is fixed to either one of a door and a vehicle body, and the leading end of the wiring harness that is withdrawn from the guide frame through the withdrawal opening is extended to the other of the door and the vehicle body, so that the wiring harness comes from and returns into the guide frame according to opening and closing movements of the door.

By arranging the wiring harness inside the guide frame to extend not linearly, but in a roundabout manner, the wiring harness can be withdrawn from the guide frame when the door is opened, thereby following the movement of the door. When the door is closed, the extended wiring harness returns back into the guide frame, in particular in the roundabout manner. Further, a twisting during the opening and closing of the door can be taken up by the twisting of the wiring harness withdrawn from the guide frame.

As is clear from the above description, since the wiring harness is or may be arranged not in the same position as the hinge point along the horizontal direction, but in the position more inward toward the passenger compartment in the inventive wiring harness arranging construction in the door hinge portion of the vehicle, the wiring harness is required to have both an extendible/contractible function and a twisting function when the door is opened and closed. Since the guide frame having both functions is provided and the wiring harness is mounted on the guide frame, the wiring harness is allowed to extend and contract when the door is opened and closed, and the wiring harness withdrawn from the guide frame twists itself. Accordingly, the wiring harness can smoothly follow the opening and closing movement of the door by extending and contracting while twisting.

Since the guide frame is or may be only a thin and small frame or a thin box through which the wiring harness is passed, it can be mounted in a small space in the door or the vehicle body and/or between them. Further, if a trim panel is mounted after the guide frame is mounted, the guide frame is not exposed to the passenger compartment and does not degrade the appearance. Furthermore, since the guide frame is small and lightweight, the mounting of the guide frame does not require an increased force to open and close the door, i.e. does not make the door heavier to open and close.

Further, since the wiring harness is or may be arranged in a position more inward than the hinge point and the weatherstrip, it is not necessary to provide a water preventing means for the wiring harness, obviating the need to use grommets or like conventional water preventing devices. Furthermore, since the wiring harness is arranged at the side of the inner surface of the inner plate of the door panel, a conventionally required operation of arranging the wiring harness inside the door panel and withdrawing it through the through hole formed in the front end surface of the door panel can be eliminated. As a result, an operation of arranging the wiring harness into the door panel can be considerably made easier as compared with the prior art.

Preferably, there is provided a wiring harness arranging device for arranging a wiring harness that will extend between a vehicle body and a door in a position more toward a passenger compartment than either the weatherstrip or a mount position of a hinge for connecting the vehicle body and the door. The wiring harness arranging comprises at least one guide frame which has a small width and in which an insertion opening and a withdrawal opening for a wiring harness are formed in spaced-apart positions. The wiring harness is fixedly inserted through the insertion opening of the guide frame and withdrawn through the withdrawal opening after being arranged in a roundabout manner. One guide frame is fixed to a door and a second is fixed to the vehicle body. The wiring harnesses withdrawn from both guide frames through their withdrawal openings are made continuous, so that the wiring harnesses come from and return into the guide frames according to opening and closing movements of the door.

Accordingly, the guide frames are mounted on the door and the body, so that the wiring harnesses are withdrawn from both guide frames when the door is opened while they return into the guide frames when the door is closed.

Preferably, the guide frame has a substantially triangular shape; the insertion opening is provided at a first apex thereof; the withdrawal opening is provided at a second apex thereof; and the wiring harness is so accommodated in the guide frame as to extend in a roundabout manner toward a third apex. The shape of the guide frame is not limited to the above. However, by forming the guide frame substantially triangular, the wiring harness can be arranged in a roundabout manner along the inner side surface of the guide frame inside the guide frame.

Preferably, the guide frame is fixedly and vertically accommodated in a recess formed in an end surface of the door, an inner surface of the door toward a passenger compartment, an end surface of the vehicle body facing the end surface of the door, or an end surface of an instrument panel toward the door. By vertically accommodating the guide frame, the width of the accommodation space can be made smaller and, accordingly, the guide frame can be easily mounted on the door having a small installation space. In the case that the guide frame is mounted on an instrument panel or the vehicle body which has a relatively large installation space, it may be horizontally fixed. In other words, how the mounted guide frame is oriented does not matter provided the wiring harness is accommodated inside the guide frame with a margin length by which the wiring harness is withdrawn from the guide frame when the door is opened.

Preferably, the guide frame has an open rear surface or has a boxlike shape with a small width and is formed with a locking claw to be detachably locked with an engaging groove formed in the door or the vehicle body, and the wiring harness is slidably accommodated in a space defined between an open front surface of the guide frame and the door or the vehicle body in the case of the guide frame having an open rear surface or slidably accommodated inside the guide frame in the case of the box-shaped guide frame. The smaller the space taken up by the guide frame, the more preferable construction. Accordingly, there is adopted a construction in which the wiring harness is slidably held between the door or the vehicle body and the guide frame. Further, if the locking claw engageable with the locking groove formed in the door or vehicle body is provided, the guide frame can be mounted by one simple operation. In the case of the box-shaped guide frame, the width of its hollow portion is set slightly larger than the outer diameter of the wiring harness so that the wiring harness does not overlap inside the guide frame.

Preferably, tubular portions project at the insertion and withdrawal openings of the guide frame and the tubular portion at the insertion opening and the wiring harness are fixed by taping. Specifically, the insertion and withdrawal openings for the wiring harness needs to be fixed in specified positions. Accordingly, the tubular portions through which the wiring harness is passed are provided at these openings, and the wiring harness is fixed to the tubular portion by taping at the insertion opening. With such a projecting tubular portion, the wiring harness can be easily fixed by taping or like fixing means.

Preferably, the wiring harness is passed through a restricting tube having open opposite ends. The tube then is placed partially inside the guide frame in a position continuous with the withdrawal opening so as to be slidable. If the wiring harness is passed through the restricting tube inside the guide frame as above, the wiring harness can securely return into the guide frame through the withdrawal opening when the door is closed.

Preferably, the wiring harness is tightly passed through the restricting tube so that the restricting tube moves together with the wiring harness, and a spring is provided between the restricting tube and the guide frame to bias the wiring harness in a direction to pull it into the guide frame. If the restricting tube is biased in the pull-in direction by the spring as above, the wiring harness can be pulled back into the guide frame faster than the door is closed.

It is preferable to cover a withdrawn portion of the wiring harness between the door and the vehicle body with a tube or the like having a specified rigidity. Further, a mount member of rubber or elastic material may be mounted at the leading end of the wiring harness which is withdrawn from the guide frame and mounted on the vehicle body or the door so as to take up the twisting of the wiring harness.

The guide frame may be fixed to the door and the wiring harness is arranged by inserting the leading end of the wiring harness having passed through the guide frame into an opening formed in an end surface of an instrument panel toward the door or a lower surface thereof at the door side.

According to a further preferred embodiment of the invention, there is provided a wiring harness arranging device for arranging a wiring harness that will extend between a vehicle body and a door in a position more toward a passenger compartment than a mount position of a hinge for connecting the vehicle body and the door and a weatherstrip. The device comprises a container casing with a space for accommodating the wiring harness while being looped. Insertion and withdrawal openings for the wiring harness are opposed to each other in the casing of harness fixing portion projects from the outer surface of the insertion opening. The wiring harness may be passed through the container casing by being inserted through the insertion opening and withdrawn through the withdrawal opening after being looped inside it. The container casing is fixed to either one of the door and the vehicle body and the wiring harness withdrawn from the container casing is extended to the other of the door and the vehicle body and secured thereto by a clamp, so that the wiring harness passed through the container casing can extend and contract while varying the diameter of the loop as the door is opened and closed.

As is clear from the above, the wiring harness to be arranged between the door and the body of the vehicle is arranged not in the same position as the hinge point, but in the position more inward toward the passenger compartment. Accordingly, the wiring harness is required to have both an extendible/contractible function and a twisting function when the door is opened and closed. Since the container casing having a function of extending and contracting the wiring harness is provided, the wiring harness can extend and contract as the door is opened and closed. Further, since the wiring harness withdrawn from the container casing can twist itself, it can smoothly follow the opening and closing movements of the door.

Further, since the container casing has such a small configuration which only accommodates the wiring harness in a looped state, it can be mounted in a small space. Further, since the container casing is not very much exposed to the passenger compartment, it does not degrade the appearance. Even if the container casing is mounted on the door, since it is small and lightweight, the mounting of the container casing does not require an increased force to open and close the door, i.e. does not make the door heavier to open and close.

Further, since the wiring harness is arranged in a position more inward than the hinge point and the weatherstrip, it is not necessary to provide a water preventing means for the wiring harness, obviating the need to use grommets or like conventional water preventing devices.

Furthermore, since the wiring harness is arranged at the side of the inner surface of the inner plate of the door panel, a conventionally required operation of arranging the wiring harness inside the door panel and withdrawing it through the through hole formed in the front end surface of the door panel can be eliminated. As a result, an operation of arranging the wiring harness into the door panel can be considerably made easier as compared with the prior art.

The container casing acts, so to speak, as a harness spool and is comprised of a main body and a lid which are integrally formed of a resin. The main body and the lid are connected with each other via a thin hinge. The insertion and withdrawal openings are formed by cutting away parts of the side walls of the main body opposite to each other. The wiring harness is accommodated in the container casing by being inserted through the insertion opening, looped once and withdrawn through the withdrawal opening. Thereafter, the lid is closed, thereby engaging lock portion and locking portions provided in corresponding positions of the main body and the lid. In the inner surface of the main body of the container casing, parts continuous with the insertion and withdrawal openings are formed at different stages in a slanting manner, so that the wiring harness looped inside the container casing is not entangled by its portions coming into direct contact with each other.

If the container casing having the wiring harness passed therethrough is fixed to the door, the wiring harness looped inside the container casing extends by being pulled as the door is opened. Further, the wiring harness withdrawn from the container casing is free to twist. Accordingly, the wiring harness extends while twisting, following the opening movement of the door. On the other hand, as the door is closed, the extended portion of the wiring harness returns into the container casing by being pushed by the door since the wiring harness is fixed at the insertion opening of the container casing, with the result that the wiring harness is contained while being looped with an original large diameter.

Preferably, the wiring harness to be passed through the container casing is passed through a tube having a smooth outer surface and a function of restoring to an original looped state with a large diameter, so that the wiring harness withdrawn when the door is opened is pulled back into the container casing due to the restoring force of the tube, returning to the original looped state with the large diameter when the door is closed.

Since the wiring harness needs to smoothly move inside the container casing, it is passed through the tube having a smooth outer surface. The tube has a self-restoring force of automatically restoring to its original looped shape with a large diameter inside the container casing. For example, a nylon tube having a specified thickness may be suitably used. In other words, the wiring harness is passed through the tube which is so trained as to restore to its original looped state upon the release of a pulling force. Preferably, the restoring speed to the original shape is set faster than the closing speed of the door. By setting the contracting speed of the wiring harness faster, the jamming of the wiring harness between the door and the vehicle body while the door is closed can be prevented.

Preferably, a stopper projection is provided inside the container casing and the wiring harness is accommodated while being looped once about the stopper projection so that, while the wiring harness is withdrawn from the container casing, any further withdrawal of the wiring harness is stopped when the wiring harness winds around the stopper projection.

Even when the door is fully opened at a maximum angle and the wiring harness maximally extends, the wiring harness does not extend linearly by winding around the stopper projection inside the container casing so that it can be rewind into the container casing.

Preferably, the fixing position of container casing to the door is a recess formed in an inner surface of an inner plate of the door or a trim panel at the passenger compartment side, whereas the fixing position of the container casing to the vehicle body is an end surface of the instrument panel facing the door or a pillar provided at a lower side surface of the instrument panel. The mount position of the container casing is not limited to the above. It may be mounted on an end surface of the door toward the vehicle body or an end surface of the vehicle body toward the door.

For example, if the container casing is mounted on the inner surface of the inner plate of the door, it is not necessary to arrange the wiring harness inside the door, which simplifies the arrangement operation. Further, if the container is mounted on the instrument panel, it can be easily done as compared to a case where it is mounted on the vehicle body.

Preferably, a harness fixing portion projects from the outer surface of the insertion opening of the container casing and the wiring harness is inserted while being fixed to the insertion opening by being secured to the harness fixing portion by taping.

Further preferably, the container casing has a substantially semicircular shape and comprises a main body and a lid which is integrally formed with the main body via a thin hinge. The main body comprises a substantially semicircular bottom portion, a flat upper surface provided at the upper end of the bottom portion and an arcuate side wall. The lid has a substantially semicircular shape and is connected with the leading end of the upper surface via the thin hinge. The insertion and withdrawal openings for the wiring harness are formed at the opposite ends of the side wall near the upper surface so as to be opposed to each other. If the container casing is configured as above, the wiring harness can be easily set in the container casing only by opening the lid.

Preferably, a partition plate is provided inside the container casing to define a space communicating with the insertion opening and a space communicating with the withdrawal opening lest portions of the wiring harness withdrawn through the withdrawal opening after being inserted through the insertion opening and looped once should directly intersect (claim 6). It is further preferable to slant the partition plate and to make the insertion opening side and the withdrawal opening side at different stages. With such a partition plate, the wiring harness does not get entangled by its portions intersecting each other.

Further, if the partition plate is arranged inside the container casing lest the portions of the wiring harness looped once should come into contact with each other, the wiring harness can be smoothly wound and rewound without being entangled.

BRIEF DESCRIPTION OF THE DRAWINGS

These and other objects, features and advantages of the present invention will become more apparent upon a reading of the following detailed description and accompanying drawings in which:

FIGS. 6(A) and 6(B) show a restricting tube used in a second embodiment, wherein FIG. 6(A) is a perspective view of the restricting tube and FIG. 6(B) is a front view of the restricting tube through which the harness is passed.

FIGS. 9(A) and 9(B) show a fourth embodiment, wherein FIG. 9(A) is a rear view showing the guide frame on which a pulling force take-up member is mounted and FIG. 9(B) is a perspective view of the pulling force take-up member.

FIG. 16 is a perspective view of a tenth embodiment of the invention.

DETAILED DESCRIPTION OF THE PREFERRED EMBODIMENTS

Hereafter, embodiments of the invention are described with reference to the accompanying drawings, wherein same or similar reference signs denote or refer same or similar elements.

Figure 1:
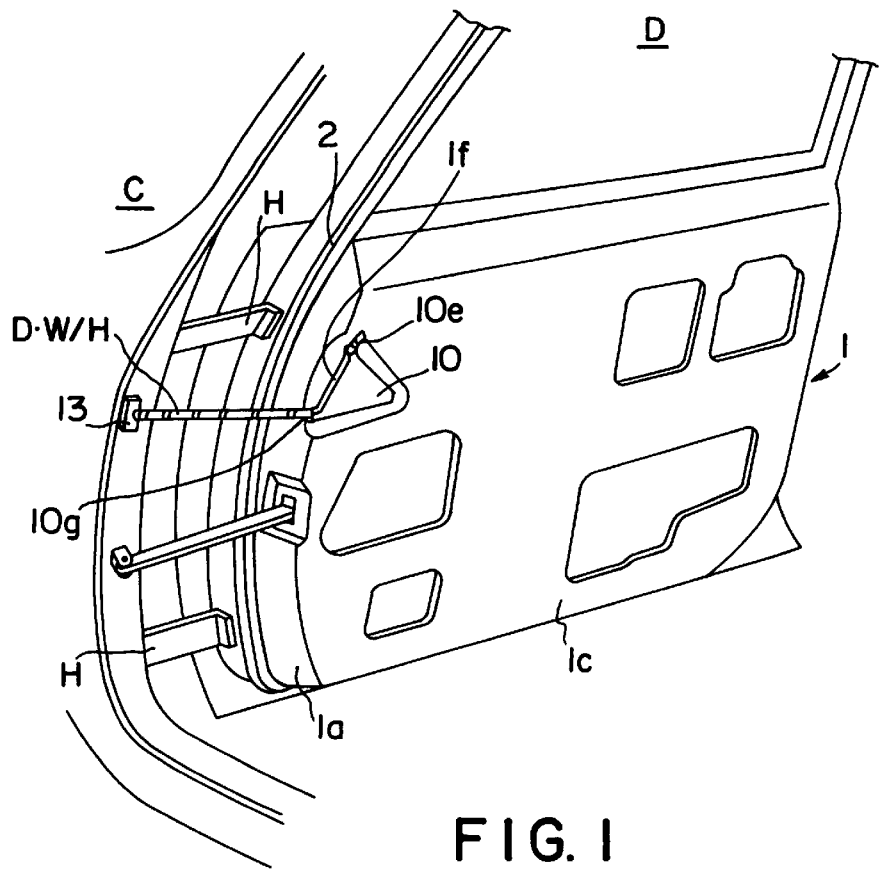
FIG. 1 is a perspective view of a first embodiment of the invention.
Figure 2A:
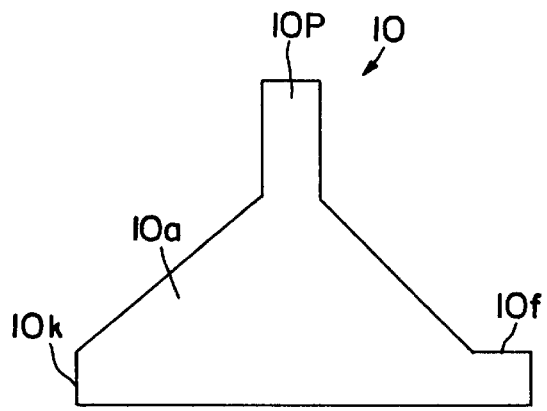
FIG. 2 is a diagram of a guide frame used in the first embodiment.
Figure 2B:
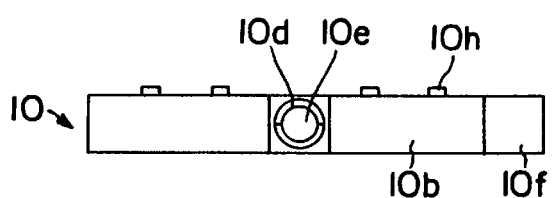
Figure 2C:
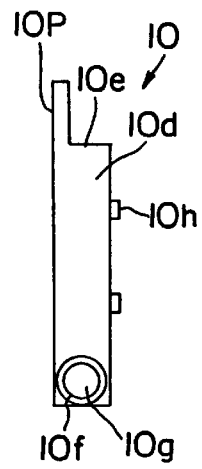

FIGS. 1 to 5 show a first embodiment in which a door harness D·W/H is arranged between a door D (as a second element) and a body C (as a first element) of a vehicle while extending from a front end surface 1a of a door panel 1 to the body C. The door hinge H may be arranged such that the door D performs a pivotal movement with respect to the body C and/or such that the door D performs a linear or translatory movement with respect to the body C (thus moving away from the body C). A front part of the door harness D·W/H to be arranged in a door hinge portion is passed through a guide frame 10 configured as shown in FIGS. 2, 3(A) and 3(B).

Figure 4A:
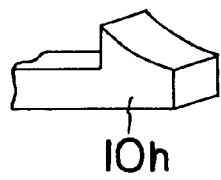
FIGS. 4(A) and 4(B) are perspective views of locking claws provided on the guide frame, respectively.
Figure 4B:
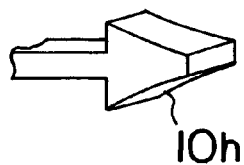

The guide frame 10 is made e.g. of a resin and has a substantially triangular shape. Specifically, narrow side walls 10b are provided at three sides of a triangular front plate 10a, and the rear surface thereof is an opening 10c. At a first apex of an upper side of the guide frame 10, a tubular portion 10d having an insertion opening 10e for a wiring harness is integrally or unitarily formed to substantially project. At a second apex of a lower side of the guide frame 10, a tubular portion 10f having a withdrawal opening 10g for the wiring harness is integrally or unitarily formed to substantially project. Further, a tongue portion 10p where the wiring harness is taped projects from the tubular portion 10d at the insertion side, and locking claws 10h project from the side walls 10b. Each locking claw 10h may have a shape as shown in FIG. 4(A). However, if a locking portion formed in the door panel as described later is a locking hole, the locking claw 10h may have a shape as shown in FIG. 4(B). Instead of providing the tubular portions, arcuate openings may be formed in the side walls to form the insertion opening 10e and the withdrawal opening 10g. Alternatively, semicircular tubular portions may be provided.

Figure 3A:
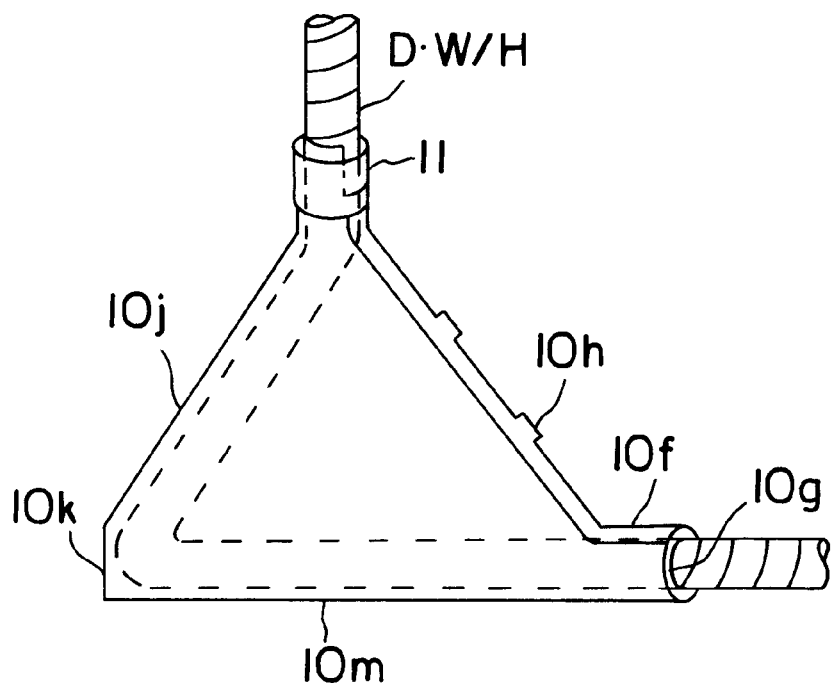
FIGS. 3(A) and 3(B) are a front view and a rear view of the guide frame of FIG. 2 with a harness passed therethrough, respectively.
Figure 3B:
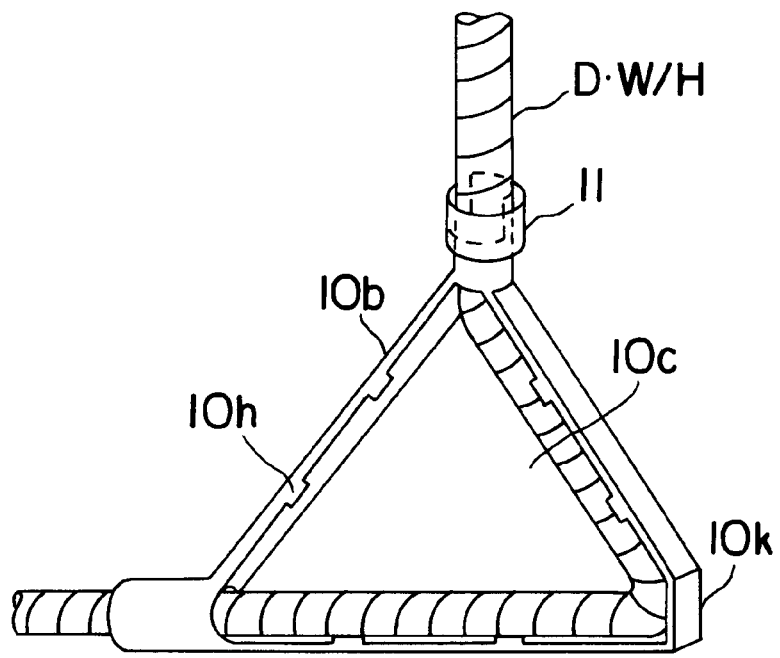

The door harness D·W/H is mounted in the guide frame 10 as shown in FIGS. 3(A) and 3(B). Specifically, the door harness D·W/H is inserted into a space defined by the side walls 10b and the front plate 10a; is fed along a side 10m toward the withdrawal opening 10g after being fed along a side 10j toward a third apex 10k; and is consequently withdrawn through the withdrawal opening 10g. At and near the insertion opening 10e, tape 11 is wound around the door harness D·W/H and the outer surface of the cylindrical portion 10d to position and fix the door harness D·W/H.

The guide frame 10 partially containing the door harness D·W/H is mounted in a recess 1f formed by indenting the end surface 1a of the door panel 1 and the inner surface of an inner plate 1c as shown in FIG. 1 such that the opening 10c at the rear surface faces the bottom surface of the recess 1f and vertically extends and that the withdrawal opening 10g faces toward the body C. On the bottom surface of the recess 1f, there are provided locking claws (not shown) engageable with the locking claws 10h. The guide frame 10 is fixed to the recess 1f by engaging the locking claws 10h with the mating locking claws or recess at one time.

In this state, a space slightly larger than the outer diameter of the door harness D·W/H is defined between the front plate 10a of the guide frame 10 and the bottom surface of the recess 1f. The door harness D·W/H is accommodated in this space such that it is free to slide, but cannot overlap.

The door harness D·W/H withdrawn through the withdrawal opening 10g of the guide frame 10 is extended to the body C, and a rubber mount member 13 mounted at the leading end of the door harness D·W/H is fitted into a mount hole 14. The rubber mount member 13 may be a conventionally used grommet.

In the door panel 1 of the door D, a weatherstrip 2 is mounted in a position more toward a passenger compartment than a hinge H with the body C, and the recess 1f in which the guide frame 10 is mounted is located more toward the passenger compartment than the mount position of the weatherstrip 2. Accordingly, it is not necessary to provide a special water preventing device for the door harness D·W/H on which the guide frame 10 is mounted.

As shown in FIG. 1, the door harness D·W/H having its front part passed through the guide frame 10 is arranged along the inner surface 1g of the inner plate of the door panel 1.

As described above, the guide frame 10 is fixed to the recess 1f formed in the position more toward the passenger compartment than the hinge point of the hinge H and the weatherstrip 2, the door harness D·W/H needs to extend while twisting according to an opening angle of the door D when the door D is opened. Likewise, when the door D is closed, the door harness D·W/H needs to contract while untwisting.

Figure 5A:
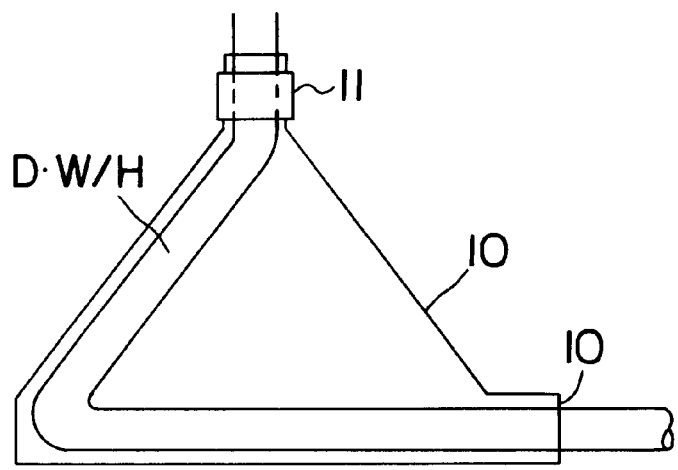
FIGS. 5(A) and 5(B) are schematic diagrams showing the action of the harness according to the first embodiment.
Figure 5B:
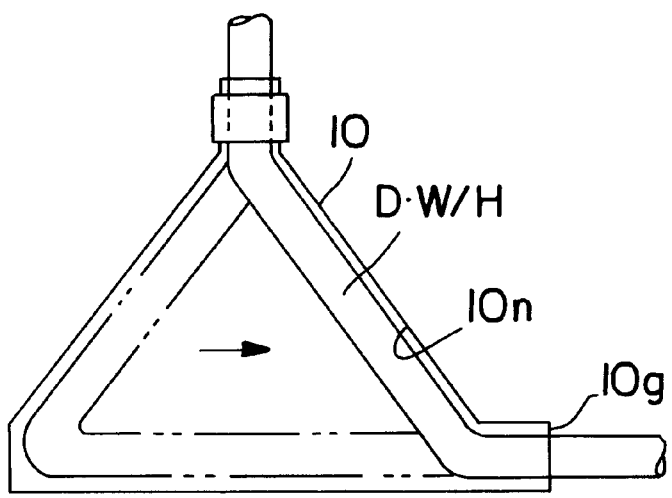

Since the door harness D·W/H is accommodated inside the guide frame 10 in such a manner as to substantially have a margin length as shown in FIG. 5(A) i.e. such a length that the door harness D·W/H is arranged along sides 10j, 10m of the guide frame 10 in the contracted state (e.g. with the door closed), when the door D is opened, the door harness D·W/H extends while being withdrawn through the withdrawal opening 10g. Specifically, the door harness D·W/H is withdrawn until it extends along a side 10n. Further, a twisting necessary when the door D is opened is taken up by the twisting of the door harness D·W/H withdrawn through the withdrawal opening 10g. Accordingly, the movement of the door harness D·W/H can follow the opening movement of the door D.

On the other hand, when the door D is closed, the withdrawn door harness D·W/H goes back into the inside of the guide frame 10 through the withdrawal opening 10g, returning to the state of FIG. 5(A).

As described above, since the guide frame 10 has a function of extending and contracting the door harness D·W/H and the door harness D·W/H withdrawn from the guide frame 10 can twist itself, the door harness D·W/H is allowed to extend while twisting and to contract while untwisting e.g. as the door D is opened and closed.

Figure 6A:
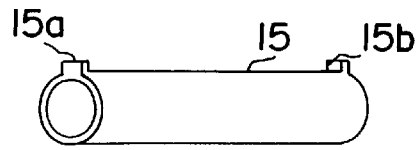
Figure 6B:
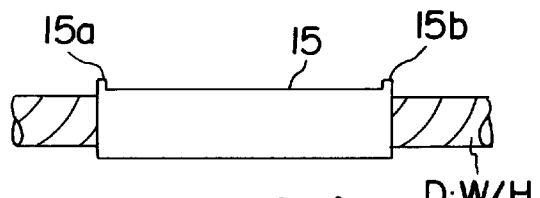
Figure 7A:
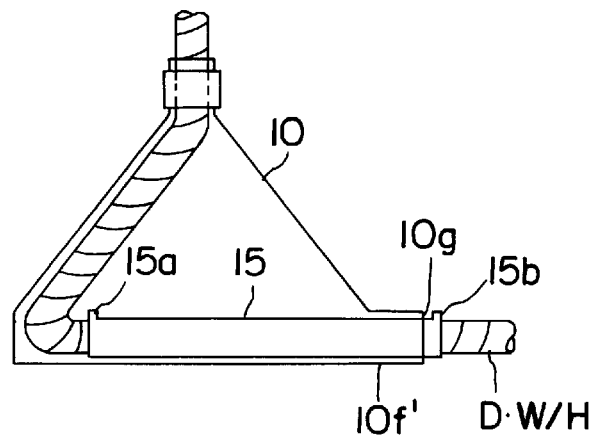
FIGS. 7(A) and 7(B) are schematic diagrams showing the action of the second embodiment.
Figure 7B:
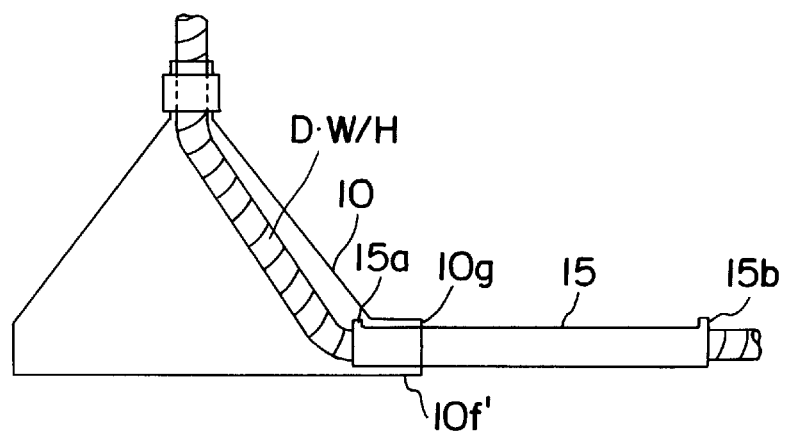

FIGS. 6 and 7 show a second embodiment, in which a cylindrical restricting tube 15 having open opposite ends as shown in FIG. 6 is provided and a door harness D·W/H is substantially fixedly or tightly passed through the restricting tube 15 so that the restricting tube 15 moves together with the door harness D·W/H. Stoppers 15a, 15b project e.g. upward at the opposite ends of the restricting tube 15.

On the other hand, a tubular portion 10f' of the guide frame 10 having a withdrawal opening 10g has a substantially semicircular cross section. The restricting tube 15 is inserted into the guide frame 10 sideways through the withdrawal opening 10g as shown in FIG. 7(A), so that it is positioned substantially continuously with the withdrawal opening 10g, i.e. slidably along the side 10m. In this mounted state, the stopper 15a at the front end is located at the inside of the guide frame 10 and the stopper 15b at the rear end is located at the outside of the withdrawal opening 10g. The stoppers 15a, 15b have a diameter substantially larger than the semicylindrical portion 10f', so that the movement of the restricting tube 15 and the door harness D·W/H stops when the stopper 15a or 15b comes into contact with the semicylindrical portion 10f'.

Accordingly, when the door harness D·W/H is withdrawn when the door D is opened, the stopper 15a stops in a position abutting against the tubular portion 10f', where the door D is fully opened. Further, when the door harness D·W/H is pulled into the guide frame 10 when the door D is closed, the stopper 15b stops in a position abutting against the tubular portion 10f', where the door D is completely closed.

As described above, by providing the restricting tube 15, the door harness D·W/H is substantially linearly withdrawn and pulled back through the withdrawal opening 10g, making the extension and contraction of the door harness D·W/H smoother. Further, since the stoppers are provided, the door harness D·W/H can extend and contract by a set length. This prevents an occurrence of an undesirable event where the door harness D·W/H is withdrawn too much to slacken between the door D and the body C. However a non-linear movement (extension/contraction) of the door harness D·W/H may be provided by suitably forming the shape of the restricting tube 15, e.g. a movement along an arcuate direction of the door harness D·W/H may be provided by providing a correspondingly arcuate restricting tube 15.

Figure 8A:
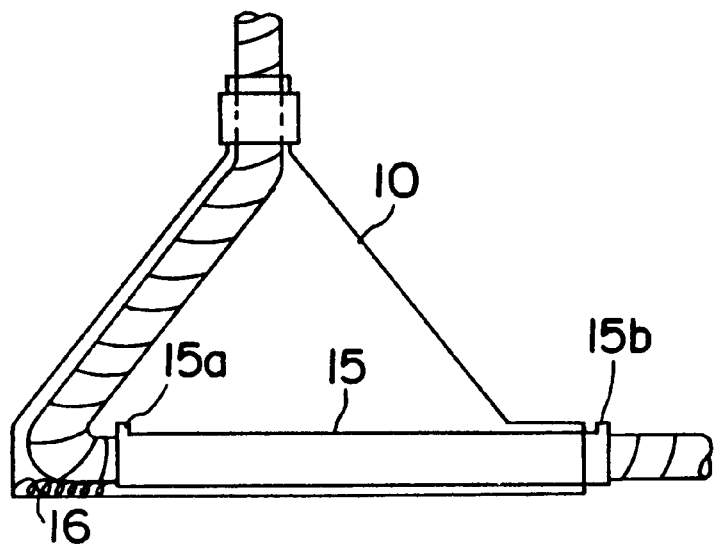
FIGS. 8(A) and ((B) are schematic diagrams showing the action of a third embodiment.
Figure 8B:
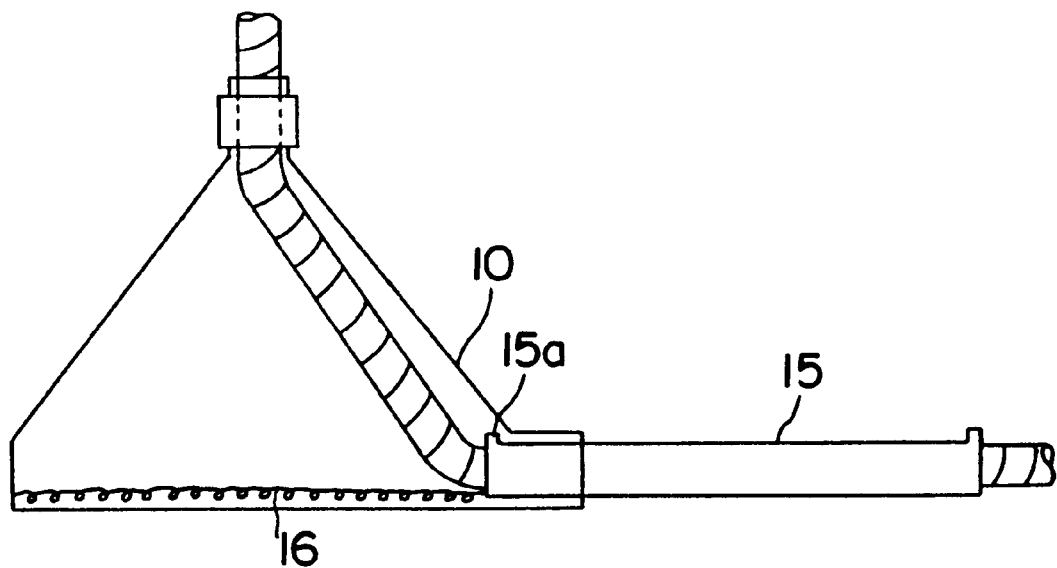

FIGS. 8(A) and 8(B) show a third embodiment, in which a return spring 16 is provided between the front end of the restricting tube 15 and an apex 10k of the guide frame 10 to bias the restricting tube 15 in a pull-back direction. By providing the return spring 16, the pull-back (contracting) speed of the door harness D·W/H can be faster than the closing speed of the door D, when the door D is closed.

Figure 9A:
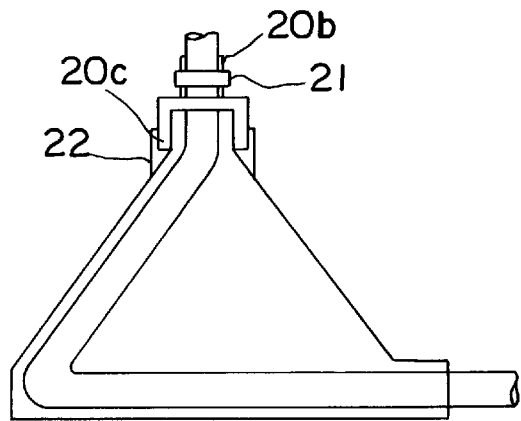
Figure 9B:
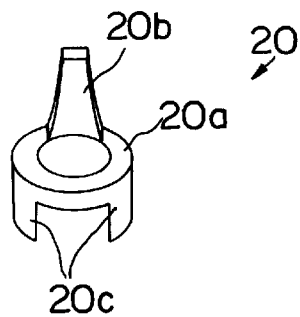

FIGS. 9(A) and 9(B) show a fourth embodiment, in which a separate pulling force take-up member 20 e.g. of rubber is mounted on the tubular portion 10d at the insertion opening 10e of the guide frame 10. As shown in FIG. 9(B), the pulling force take-up member 20 is comprised of a substantially cylindrical portion 20a to be fitted to the tubular portion 10d, a tongue portion 20b projecting from the cylindrical portion 20a, and a pair of legs 20c projecting from the cylindrical portion 20a. The tongue portion 20b is fixed to the door harness D·W/H by tape 21 or the like holding or fixing means (e.g. a clamp, clip, soldering, etc.), and the legs 20c are fixed to the guide frame 10 by tape 22. By mounting the pulling force take-up member 20 at the insertion opening 10e of the guide frame 10 as above, the door harness D·W/H can be securely kept positioned and fixed to the insertion opening 10e upon being pulled when the door D is opened.

Figure 10A:
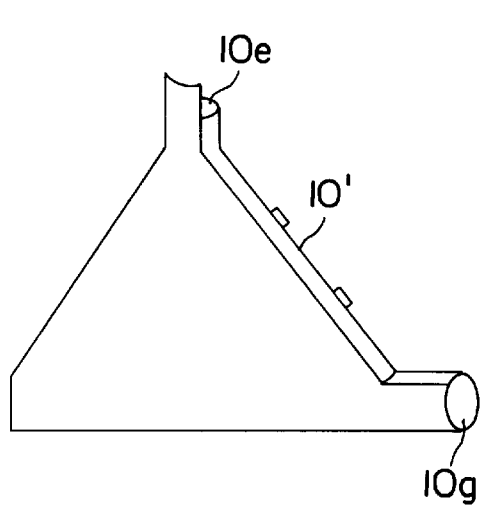
FIGS. 10(A) and 10(B) are perspective views of a guide frame according to a fifth embodiment when viewed from front and behind, respectively.
Figure 10B:
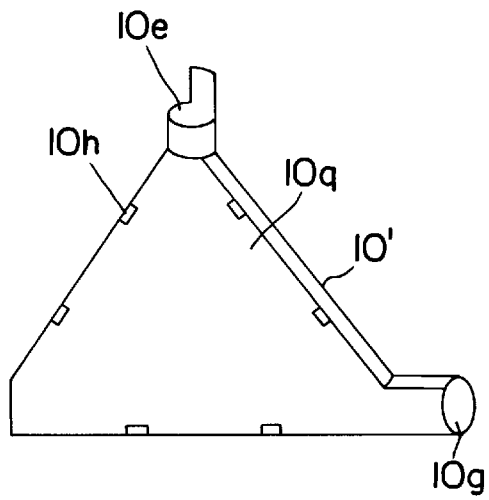

FIGS. 10(A) and 10(B) show a fifth embodiment, in which a guide frame 10' in the form of a thin box is provided. Specifically, although the guide frame 10 according to the first to fourth embodiments has an open rear surface, the rear surface of the guide frame 10' is closed by a rear plate 10g so that the guide frame 10' has a boxlike shape. The width of the box-shaped guide frame 10' is such that the wiring harness is slidable, but cannot overlap.

Figure 11A:
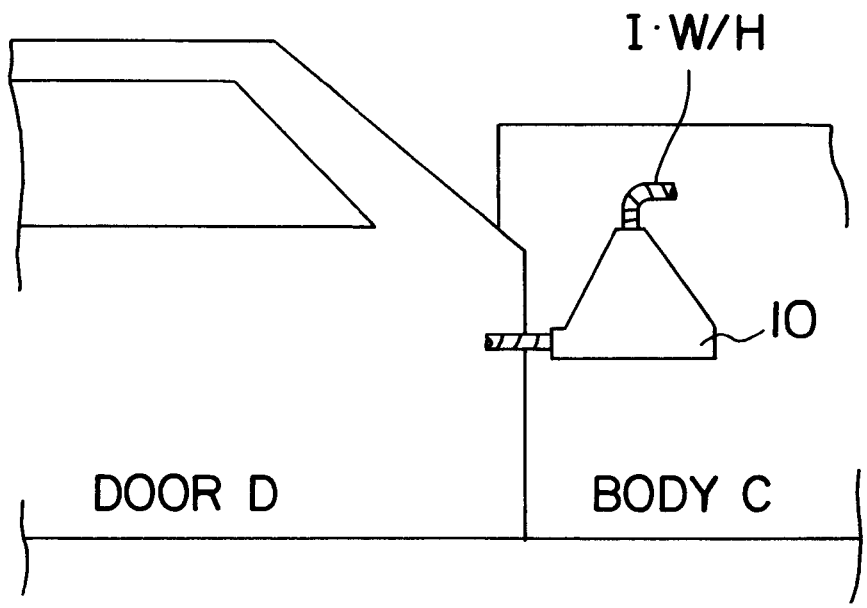
FIGS. 11(A) and 11(B) are schematic diagrams of sixth and seventh embodiments, respectively.
Figure 11B:
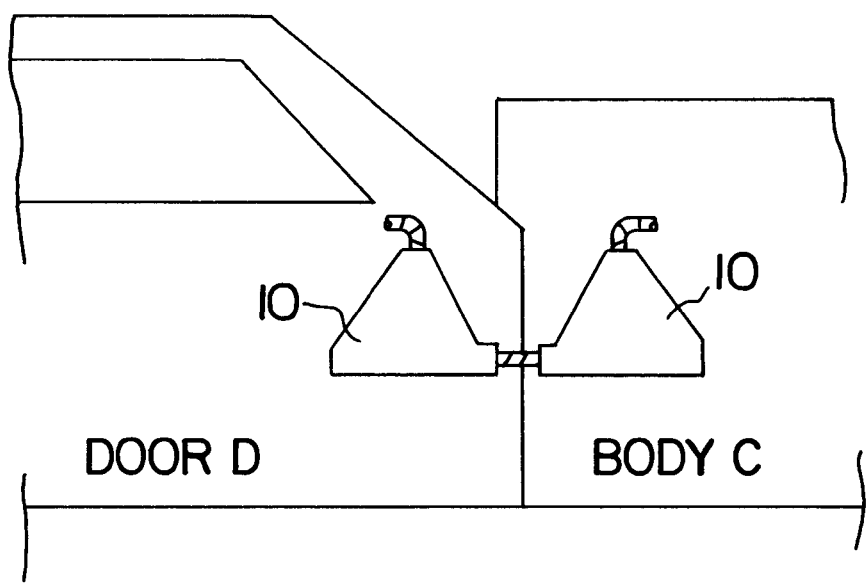

FIG. 11(A) shows a sixth embodiment, in which the guide frame 10 is fixed to the body C. In this case, an instrument panel harness I D·W/H is passed through the guide frame 10 and connected with the door harness at the door side. FIG. 11(B) shows a seventh embodiment, in which the guide frames 10 are fixed to the body C and the door D, respectively. In the seventh embodiment, the harnesses withdrawn through the withdrawal openings 10g of both guide frames 10 are made continuous. The harnesses are withdrawn from both guide frames 10 when the door D is opened while returning into both guide frames 10 when the door D is closed.

Figure 12:
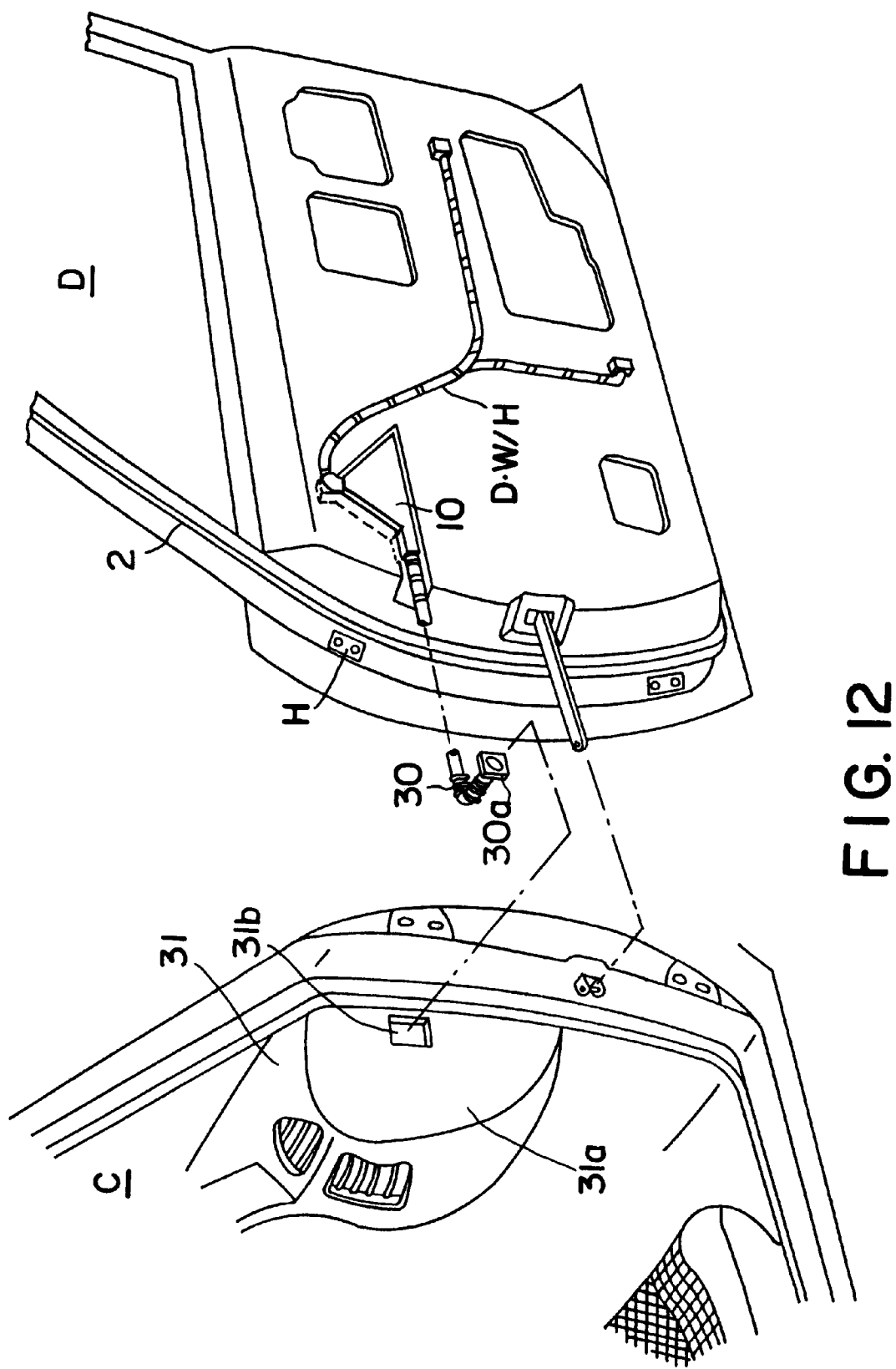
FIG. 12 is a perspective view of an eighth embodiment.
Figure 13A:
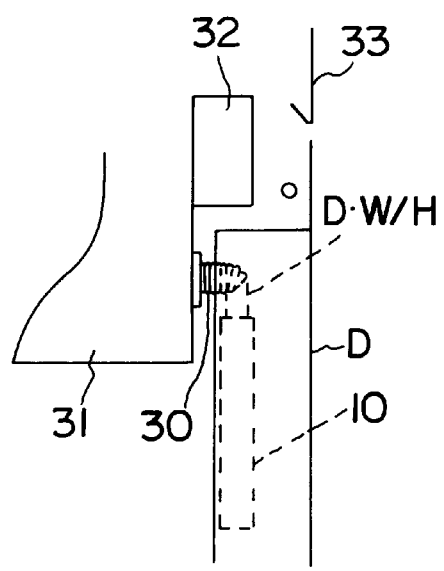
FIGS. 13(A) and 13(B) are schematic plan views of the eighth embodiment when the door is closed and opened, respectively.
Figure 13B:
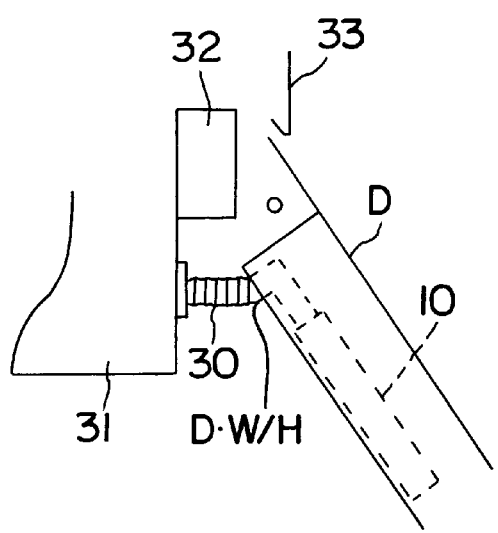

FIGS. 12, 13(A) and 13(B) show an eighth embodiment, in which a guide frame 10 similar to that of the first embodiment is fixedly accommodated in a recess formed in the inner surface of the inner plate of the door D, and a front part of the door harness D·W/H extending toward the body C through the guide frame 10 is extended to an end surface 31a of an instrument panel 31 at the door side through a corrugated tube 30 bent in L-shape. A body fixing portion 30a is provided at the leading end of the corrugated tube 30, and is fitted into an opening 31b formed in the end surface 31a of the instrument panel 31 to be fixed therein. In other words, the door harness D·W/H is so arranged as to extend from the door D to the end surface 31a of the instrument panel 31. In FIGS. 13(A) and 13(B), identified by 32, 33 are a pillar and a fender panel, respectively.

In the case that the guide frame 10 is arranged between the instrument panel 31 and the inner surface of the door D, the end surface 31a of the instrument panel 31 and the inner surface of a front part of the door D are opposite to each other as shown in FIG. 13(A) when the door D is closed, and the guide frame 10 is located in a space defined between the end surface 31a and the inner surface and accordingly cannot be seen from the passenger compartment. On the other hand, when the door D is opened, the door harness D·W/H extends while twisting as shown in FIG. 13(B) when the door D is opened, following the opening movement of the door D.

Figure 14:
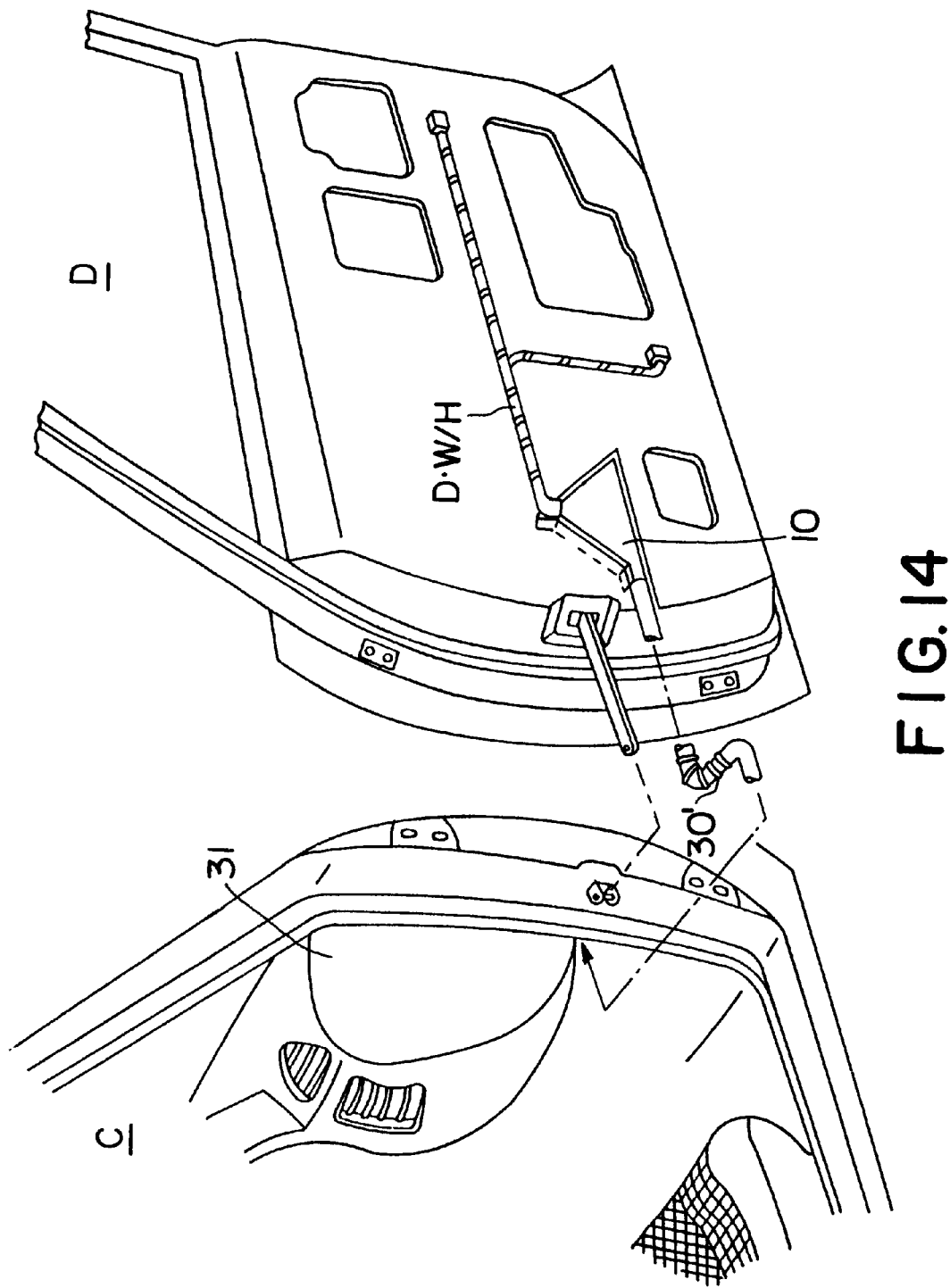
FIG. 14 is a perspective view of a ninth embodiment.
Figure 15A:
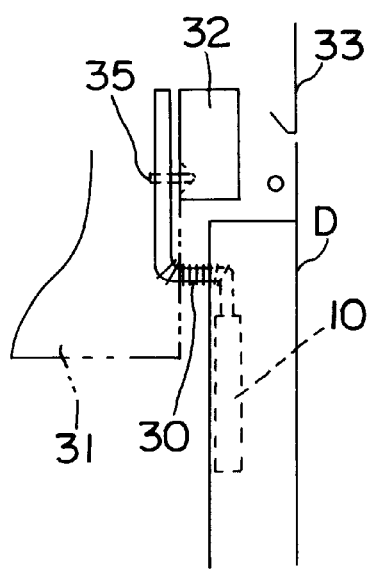
FIGS. 15(A) and 15(B) are schematic plan views of the ninth embodiment when the door is closed and opened, respectively.
Figure 15B:
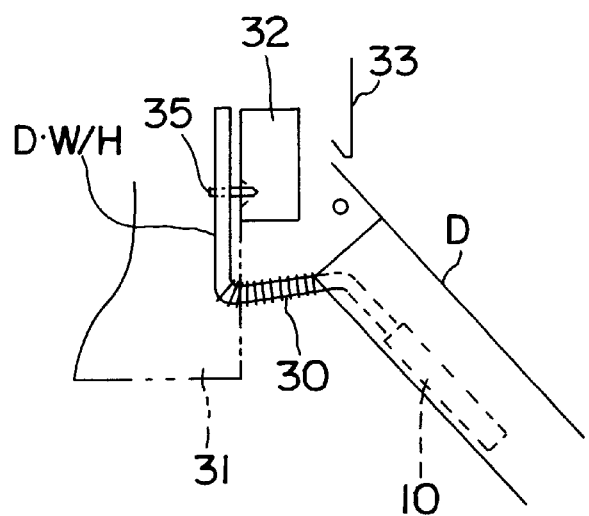

FIGS. 14, 15(A) and 15(B) show a ninth embodiment, in which the door harness D·W/H extending from the guide frame 10 mounted on the door D is arranged along the lower surface of the instrument panel 31 after being bent by being passed through a bent corrugated tube 30', and is secured to the pillar 32 by a clip 35.

If the door harness D·W/H is arranged in the instrument panel as in the eighth and ninth embodiments, it is not necessary to mount the harness in the end surface of the vehicle facing the door, i.e. to form a mount hole in the vehicle. Further, a mount operation in a narrow space can also be eliminated, improving an operability of arranging the wiring harness. In other words, the wiring harness can be mounted in a large space at the vehicle body side.

Although the guide frame is so mounted on the door and/or the body as to vertically extend, it may be so mounted as to horizontally extend.

Figure 17A:
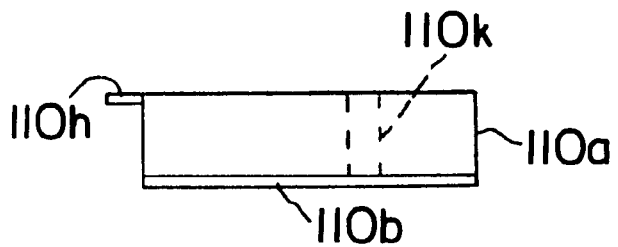
FIGS. 17(A), 17(B) and 17(C) are a plan view, a front view and a side view of a container casing used in the tenth embodiment, respectively.
Figure 17B:
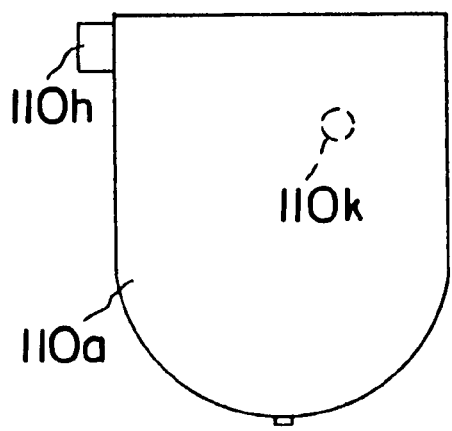
Figure 17C:
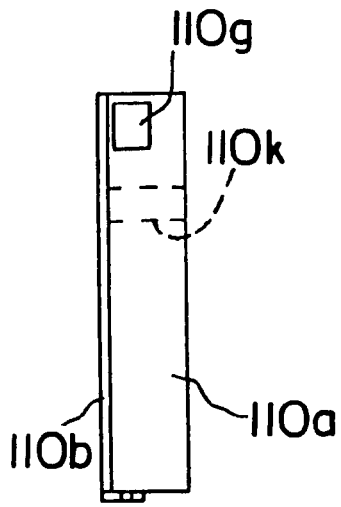
Figure 18:
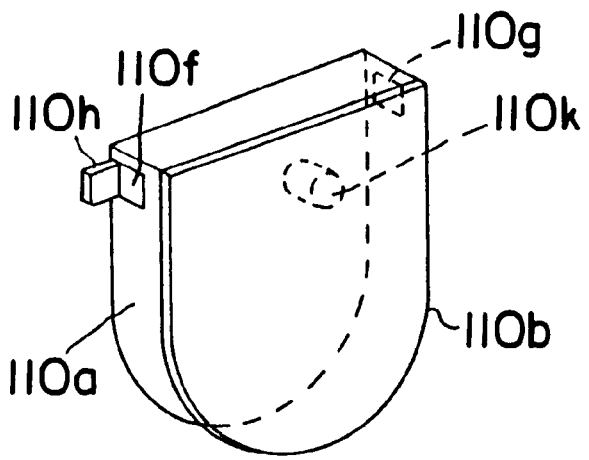
FIG. 18 is a perspective view of the container casing in its closed state.
Figure 19:
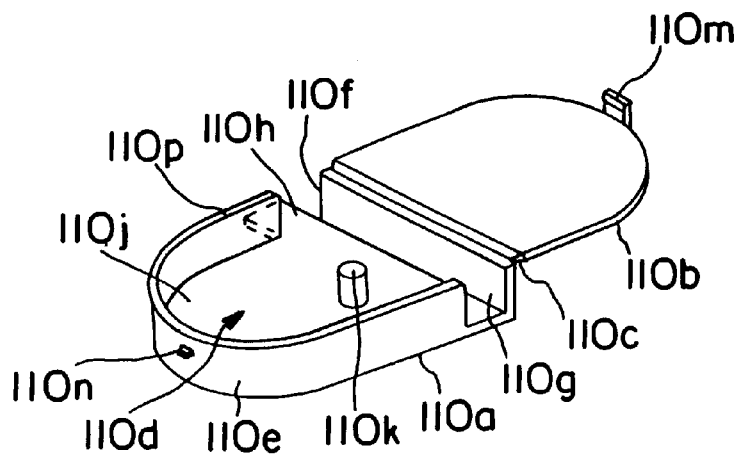
FIG. 19 is a perspective view of the container casing in its opened state.

FIGS. 16 to 23 show a tenth embodiment in which a door harness D·W/H is arranged in a door hinge portion between a door D and a body C of a vehicle while extending from a front end surface 1a of a door panel 1 to the body C. A front part of the door harness D·W/H arranged in the door hinge portion is passed through a container casing 110 configured as shown in FIGS. 17 to 18. Thereafter, this front part of the door harness D·W/H is extended to the body C, inserted into an opening 120b formed in a side surface of an instrument panel 120 toward the door D, and secured to the inner surface of the instrument panel by a clamp 121 as shown in FIG. 23.

The container casing 110 acts, so to speak, as a harness spool (i.e. there is in other words always a sufficient length or reserve of wiring harness D·W/H accommodated in the container casing 110, so as to match to the movement of the wiring harness D·W/H caused e.g. by the opening of the door D) and is comprised of a main body 110a and a lid 110b which are integrally or unitarily formed e.g. of a resin. The main body 110a and the lid 110b are connected with each other via a preferably thin hinge 110c. The container casing 110 has a thin box-shape having a substantially semicircular cross section and, when the lid 110b is closed, defines a hollow portion 110d in which the wiring harness D·W/H having passed through a tube 11 shown in FIG. 20 is slidable or arrangeable.

Specifically, the main body 110a is comprised of a bottom portion 110j having a substantially semicircular cross section, a flat upper surface 110p provided at the upper end of the bottom portion 110j and an arcuate side wall 110e. The lid 110b has a substantially semicircular cross section and is connected with the leading end of the upper surface 110p via a thin hinge 110c.

At the main body 110a of the container casing 110, the opposite ends of a curved side wall 110e are cut away to form an insertion opening 110f and a withdrawal opening 110g for the wiring harness which are opposed to each other, and a harness fixing portion 110h projects from the edge of the outer surface at the insertion opening 110f. Further, a projection 110k is provided at a bottom portion 110j. A lock portion having a lock hole 110m is provided at the leading end of the lid 110b, and a lock claw 110n is provided in such a position of the side surface of the main body 110a to be engageable with the lock hole 110m when the lid 110b is closed.

Figure 20:
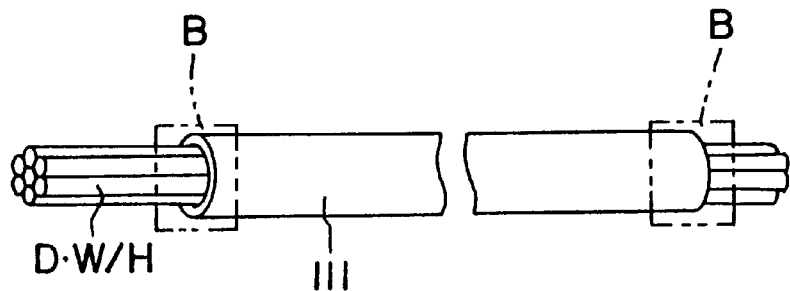
FIG. 20 is a perspective view of a wiring harness to be passed through the container casing with a tube mounted thereon.
Figure 21:
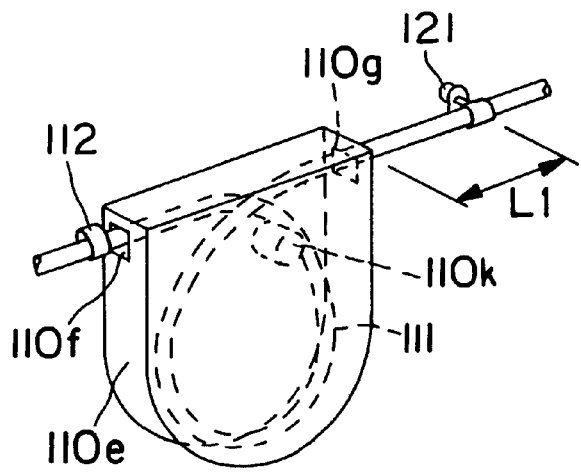
FIG. 21 is a perspective view showing a state where the wiring harness is passed through the container casing.

Into the container casing 110 is inserted the door harness D·W/H having passed through the tube 111 shown in FIG. 20 and fixed by tape B through the insertion opening 110f. The door harness D·W/H is fixed to the harness fixing portion 110h by tape 112 near the insertion opening 110f. After being looped once in such a manner as to enclose the projection 110k inside the container casing 110 as shown in FIG. 21, the door harness D·W/H is withdrawn through the withdrawal opening 110g. At this time, the door harness D·W/H is looped with a large diameter so as to substantially extend along the inner surface of the curved side wall 110e, and is trained to be looped with this large diameter. After the door harness D·W/H is passed through the container casing 110 in such a manner as to have a margin length, the lid 110b is closed to engage the lock claw 110n with the lock hole 110m.

Figure 22:
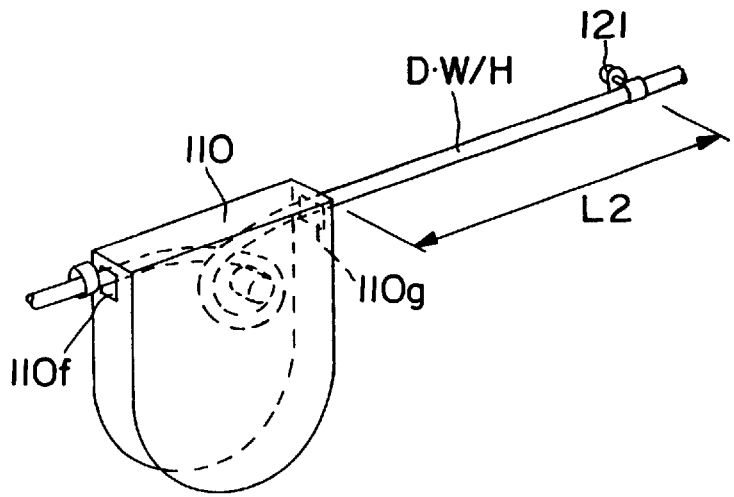
FIG. 22 is a perspective view of the wiring harness in its withdrawn state when a door is opened.

Since the tube 111 is made preferably of a nylon tube having a specified thickness and has a smooth outer surface, it can smoothly move in the container casing 110. If the door harness D·W/H is trained to be looped with a large diameter i.e. a biasing force (e.g. due to resilience of the material) biases the door harness D·W/H toward a position with a large diameter, when a pulling force is released with the door harness D·W/H withdrawn as shown in FIG. 22, the door harness D·W/H restores to its original shape of FIG. 21. Further, by being covered with the tube 111, the sliding movement of the door harness D·W/H inside the container casing 110 does not cause abrasion of the coating thereof.

On the door panel 1 of the door D on which the container casing 110 is mounted, a weatherstrip 2 is mounted in a position more toward a passenger compartment than a hinge H with the body C. A notch 1g for the insertion of the door harness D·W/H is formed in a corner portion between the end surface 1a and an inner plate 1h of the door panel 1 which is located more toward the passenger compartment than the mount position of the weatherstrip 2, and a recess 1k in communication with the notch 1g is formed in the inner plate 1h. The container casing 110 is inserted, preferably tightly fitted in the recess 1k.

The door harness D·W/H having its front part passed through the container casing 110 as shown in FIG. 21 is arranged along the inner surface of the inner plate 1h of the door panel 1, and the container casing 110 is fitted in the recess 1k. In this state, the inner plate 1h is covered by a trim panel (not shown) to fix the container casing 110 inside the door D.

The door harness D·W/H withdrawn from the container casing 110 through the withdrawal opening 110g is extended to the body C and, as described above, is secured to the inner surface of the instrument panel 120 by the clamp 121 after being inserted through the opening 120b formed in the side surface 120a of the instrument panel 120. The mount state shown in FIG. 21 is obtained when the door D is closed. At this time, the length of the door harness D·W/H from the container casing 110 mounted on the door D to the position where it is secured to the body C is L1 and the length thereof looped inside the container casing 110 is a margin length.

As described above, since the container casing 110 is accommodated in the recess 1k formed in the position more toward the passenger compartment than the hinge point of the hinge H and the weatherstrip 2 and the door harness D·W/H is extended to the instrument panel 120, the door harness D·W/H needs to extend while twisting according an opening angle of the door D when the door D is opened. Likewise, the door harness D·W/H needs to contract while untwisting when the door D is closed.

Figures 23A, 23B:
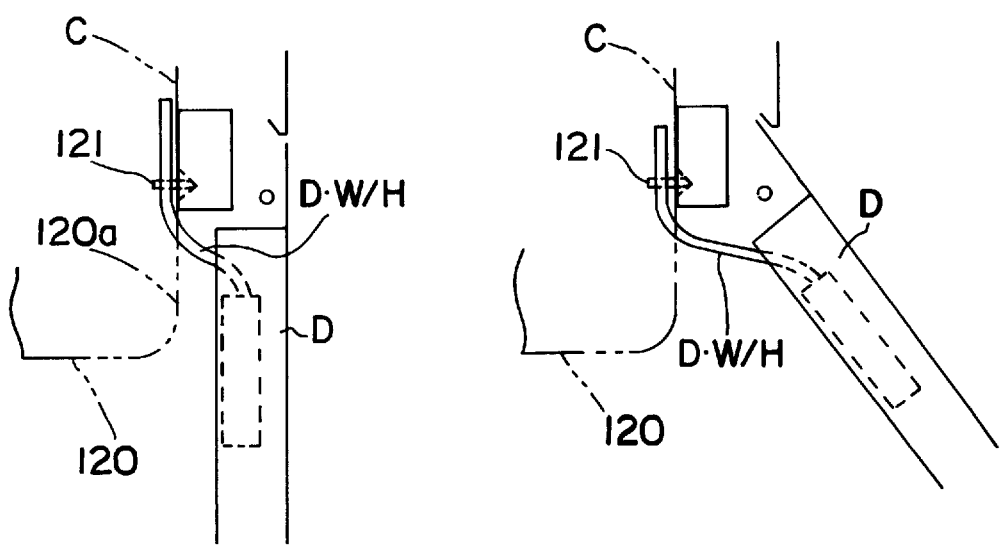
FIGS. 23(A) and 23(B) are schematic plan views showing a positional relationship of the container casing and the wiring harness when the door is closed and opened, respectively.

When the door D is opened with the door harness D·W/H as shown in FIGS. 21 and 23(A), the door harness DW/H is withdrawn from the container casing 110 through the withdrawal opening 110g while making the diameter of the loop smaller. When the door D is fully opened, the length of the door harness D·W/H from the container casing 110 to the clamp 121 increases to L2 as shown in FIGS. 22 and 23(B). The door harness D·W/H is withdrawn from the container casing 110 by a length difference (L2–L1). Inside the container casing 110, the door harness D·W/H winds around the projection 110k, thereby hindering any further withdrawal of the door harness D·W/H from the container casing 110 lest the withdrawn door harness D·W/H should slacken between the door D and the body C. The projection 110k may have a diameter big enough, to avoid damaging the wiring D.W/W, in particular by too strong bending.

As described above, when the door D is opened, the door harness D·W/H extends, following the opening movement of the door D. The door harness D·W/H withdrawn from the container casing 110 can twist itself and, accordingly, it can extend while twisting.

Since the tube 111 covering the door harness D·W/H has a self-restoring property of restoring to its original shape (e.g. due to the elastic force acting to straighten the tube 111 toward its substantially cylindrical shape), when the door D is moved in its closing direction, the door harness D·W/H returns into the container casing 110 at a speed faster than the closing speed of the door D due to the restoring force of the tube 111 while making the diameter of the loop larger. Consequently, the door harness D·W/H returns to the state of FIG. 21. Since the door harness D·W/H smoothly contracts, it can follow the closing movement of the door D and the jamming of the door harness D·W/H between the door D and the body C can be prevented.

Figure 24:
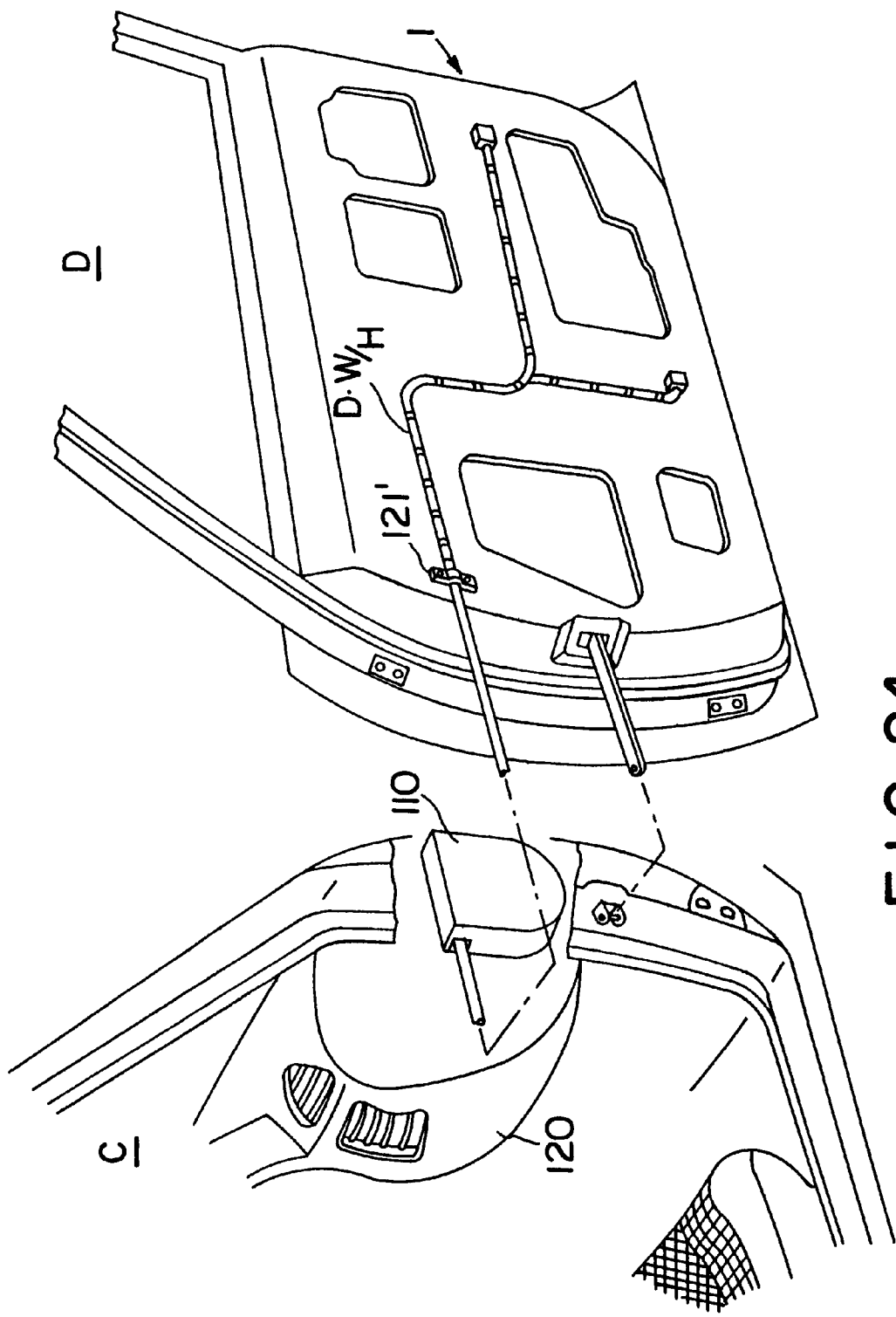
FIG. 24 is a perspective view of an eleventh embodiment.
Figure 25A:
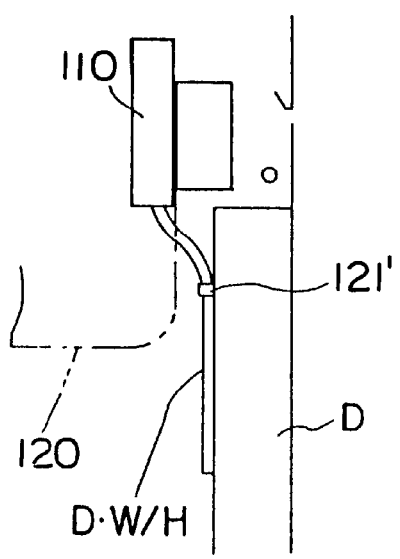
FIGS. 25(A) and 25(B) are schematic plan views showing a positional relationship of the container casing and the wiring harness according to the eleventh embodiment when the door is closed and opened, respectively.
Figure 25B:
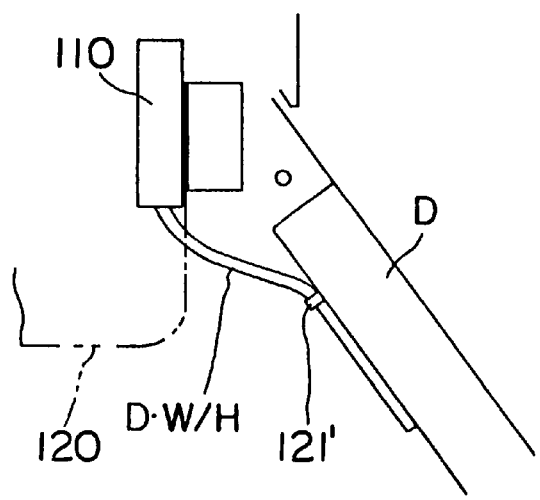

FIGS. 24, 25(A) and 25(B) show an eleventh embodiment, in which the container casing 110 is fixed to the inner surface of a side wall or panel 120a of the instrument panel 120 of the body C toward the door D. Specifically, the container casing 110 is fixed inside the instrument panel 120, and the door harness D·W/H extending from the door D is passed through the container casing 110. On the other hand, in the door D, the door harness D·W/H is fixed to the inner surface of the inner plate 1h by a clamp 121'. Alternatively, an instrument panel harness (IP harness) may be passed through the container casing 110; extended toward the door D and connected with the door harness D·W/H after being secured to the door D by a clamp.

The action of the eleventh embodiment is similar to that of the tenth embodiment. When the door D closed as shown in FIG. 25(A) is opened, the door harness D·W/H extends while twisting as shown in FIG. 25(B), following the opening movement of the door D. On the other hand, when the door D opened as shown in FIG. 25(B) is closed, the door harness D·W/H returns to the state of FIG. 25(A) by the self-restoring property of the tube covering the door harness D·W/H and, at the same time, is pressed by the door D being closed and contractibly returns into the container casing 110 while making the diameter of the loop larger.

The present invention is not limited to the foregoing embodiments. For example, the insertion and withdrawal openings of the container casing may be formed at different stages and the bottom surface of the container casing may be slanted or bevelled. With this arrangement, portions of the harness inside the container casing do not directly cross each other, i.e. do not touch each other and, accordingly, the harness can be looped without being entangled.

Figure 26:
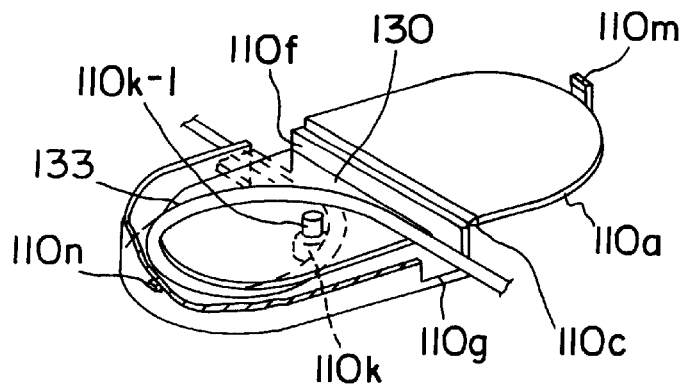
FIG. 26 is a perspective view of a twelfth embodiment.
Figure 27:
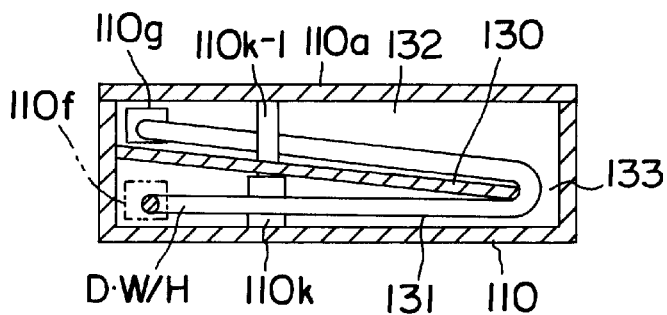
FIG. 27 is a section showing an essential portion of the twelfth embodiment.
Figure 28:
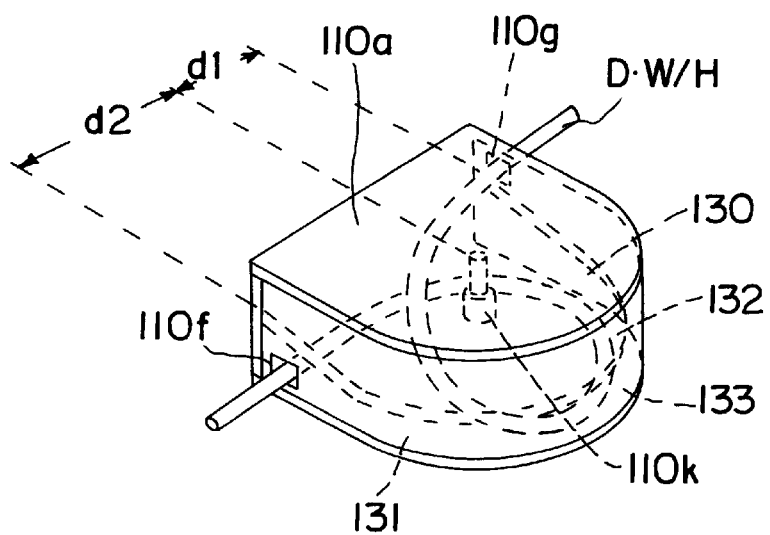
FIG. 28 is a perspective view of the wiring harness inside the container casing according to the twelfth embodiment.
Figure 29:
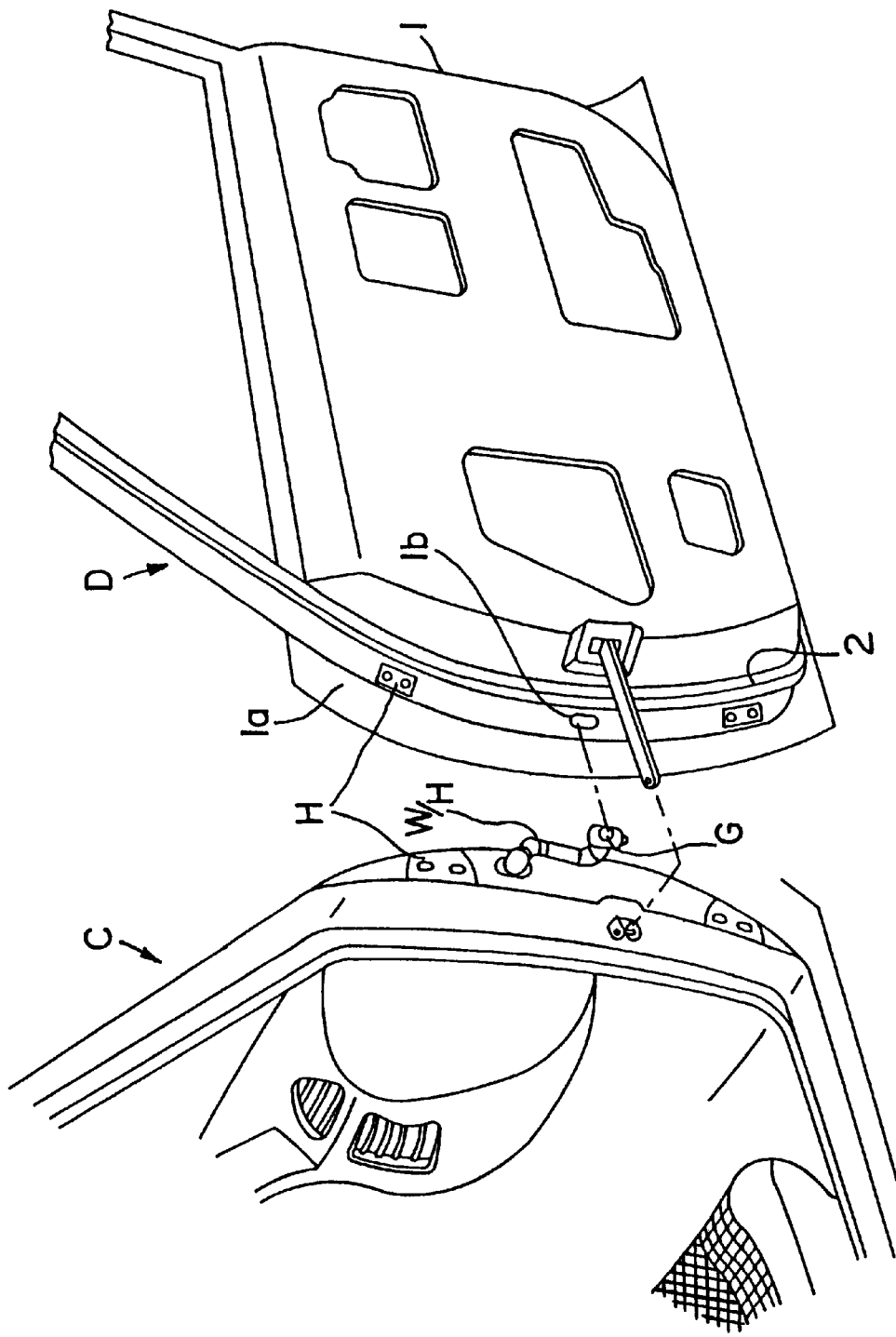
FIG. 29 is a partially exploded perspective view of a door hinge portion according to prior art.
Figure 30:
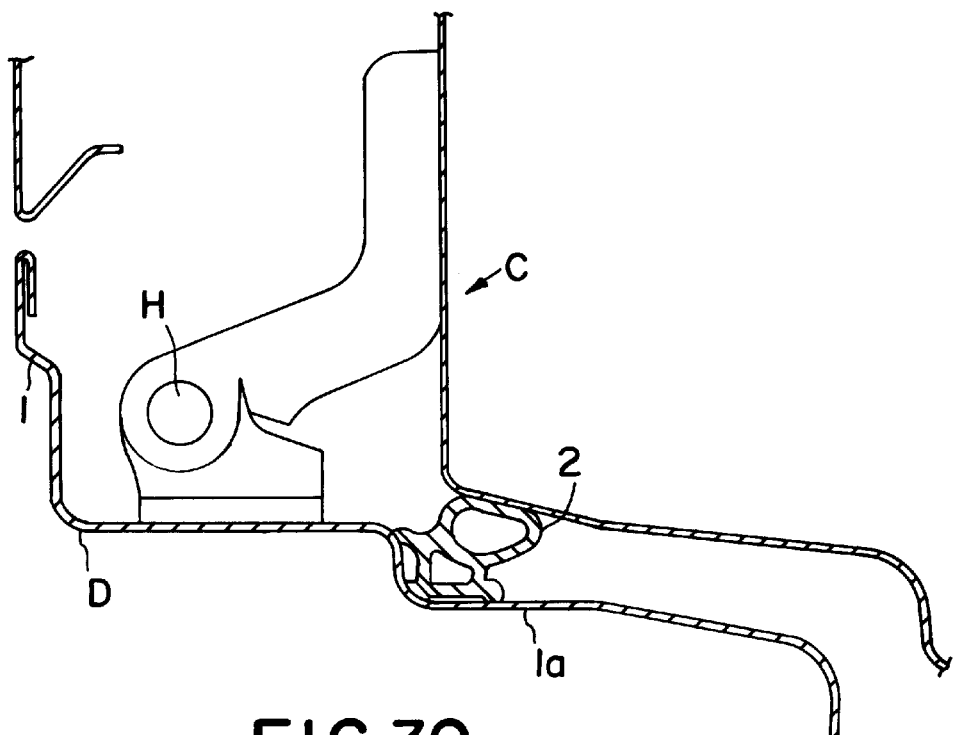
FIG. 30 is a plan view in section showing a positional relationship of a hinge and a weatherstrip.
Figure 31:
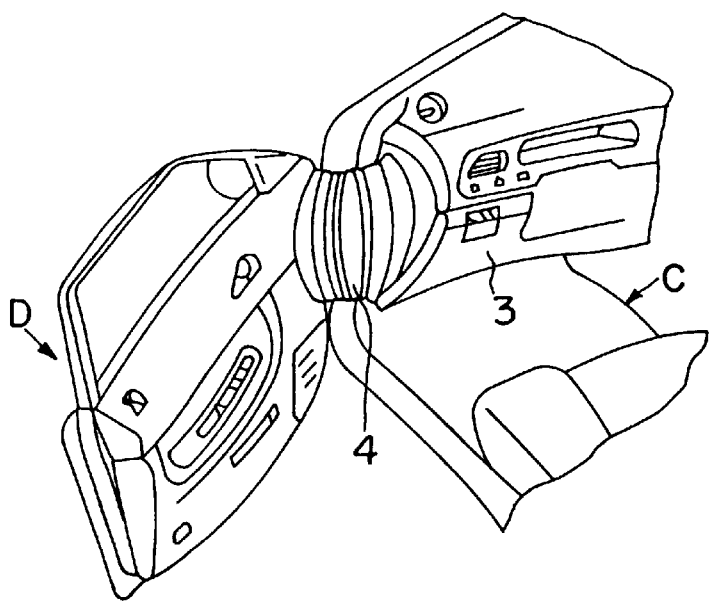
FIG. 31 is a perspective view of another prior art.
Figure 32:
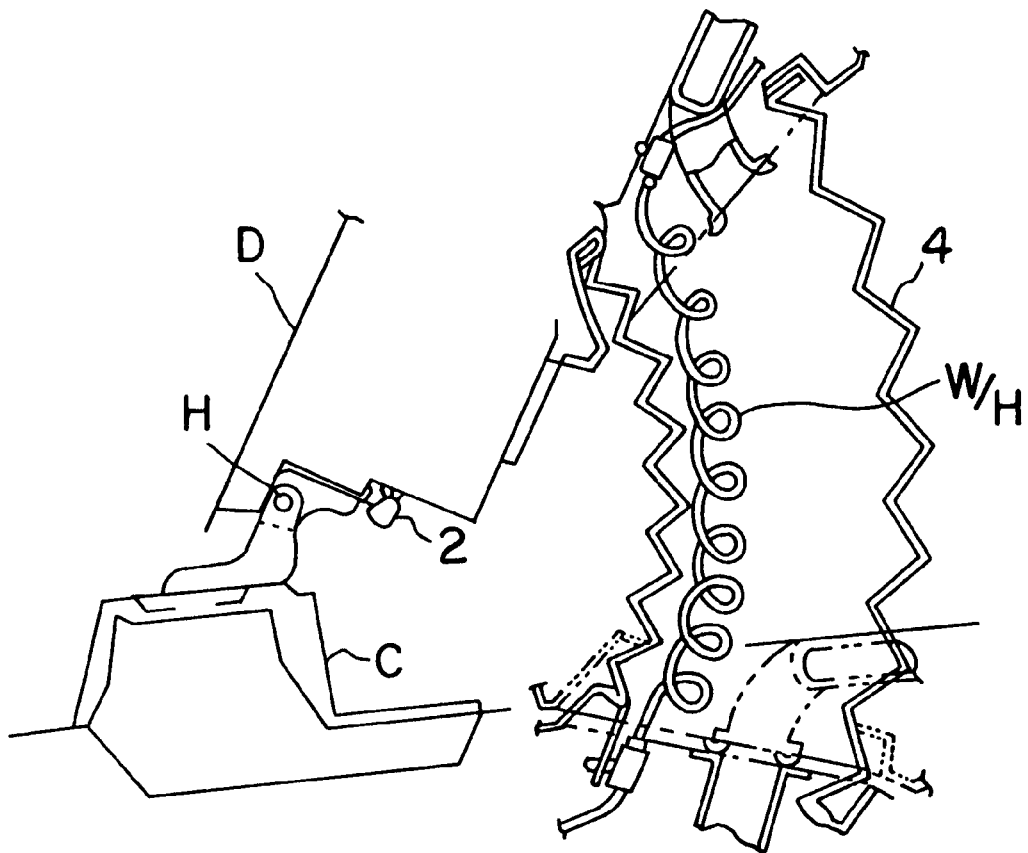
FIG. 32 is an enlarged section of an essential portion of the prior art of FIG. 31.
Figure 33A:
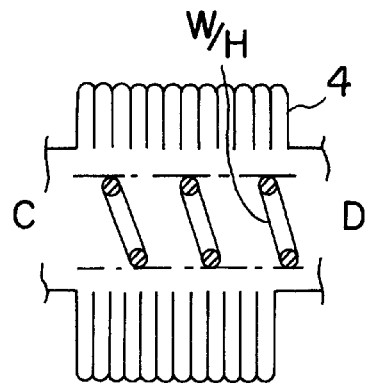
FIGS. 33(A) and 33(B) are schematic diagrams of the prior art of FIG. 31 in its normal state.
Figure 33B:
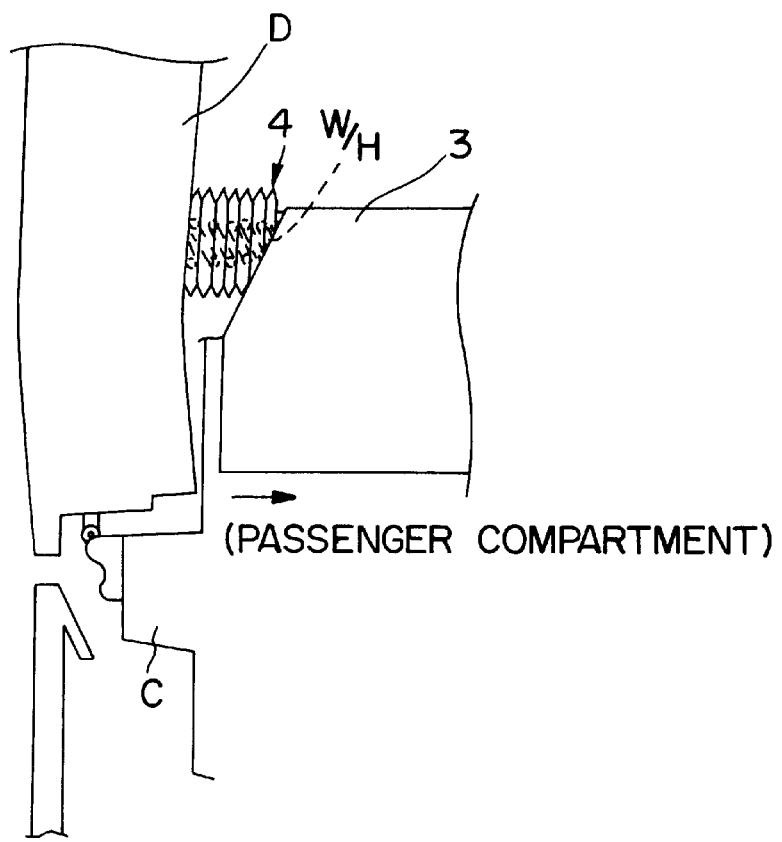
Figure 34A:
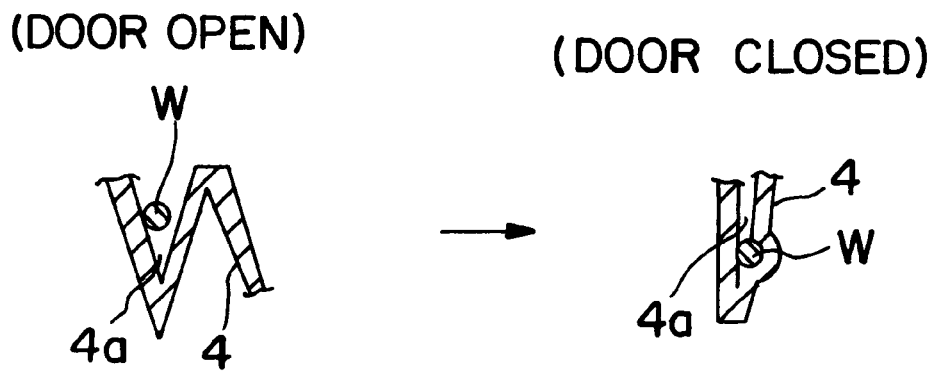
FIGS. 34(A) and 34(B) are schematic diagrams of the prior art of FIG. 31 in its abnormal state.
Figure 34B:
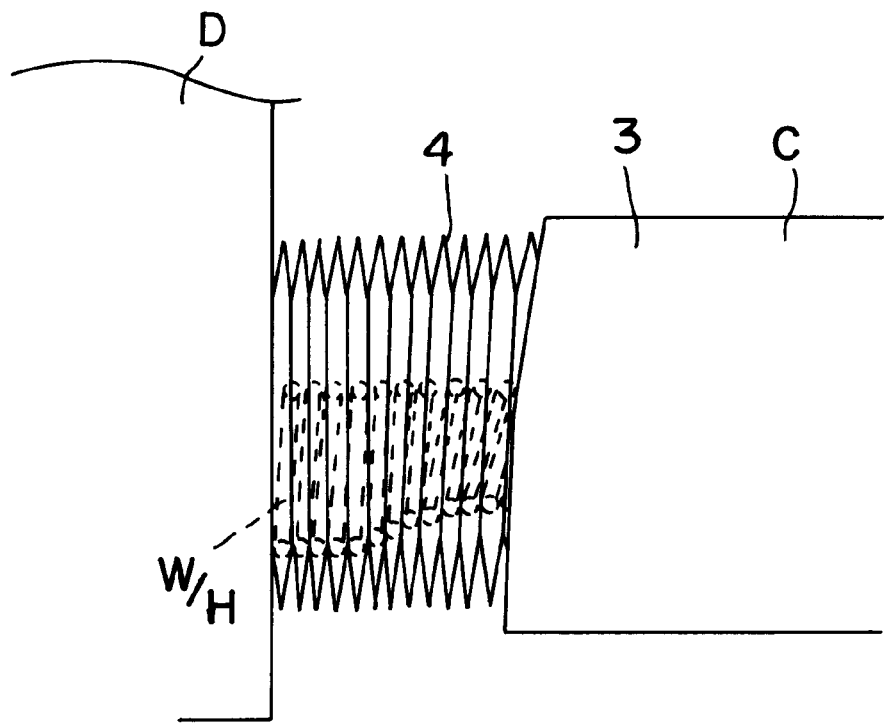

FIGS. 26 to 28 show a twelfth embodiment, in which a partition plate 130 having preferably a shape corresponding to the shape of the container casing 110, preferably a substantially semicircular shape, is arranged inside the container casing 110 to partition a preferably substantially semicircular space between the bottom portion 10j and the lid 10b into two spaces 131, 133. A mount hole 130a is formed in the partition plate 130, and the leading end of the projection is narrowed to form a mount step 110k–1 on which the partition plate 130 can rest. The partition plate 130 is slantingly mounted by inserting the mount step 110k–1 through the mount hole 130a. In this mounted state, there are defined the space 131 communicating with the insertion hole 110f, the space 132 communicating with the withdrawal opening 110g and a clearance 133 between the partition plate 130 and the side wall 110e.

Accordingly, after the door harness D·W/H inserted through the insertion opening 110f is curved around the projection 110k at the side of the space 131, it is pulled to the space 132 through the clearance 133 and withdrawn through the withdrawal opening 110g after being curved around the projection 110k–1 at the side of the space 132.

With the above construction, portions of the door harness D·W/H looped once do not come into direct contact at the intersection, particularly preventing the entanglement thereof when the diameter of the loop becomes smaller while the door is opened. Accordingly, the door harness D·W/H can be smoothly rewound.

The projection 110k preferably is provided in a decentral position with respect to the container casing 110 and/or with respect to the partition plate 130, such that the distance from the projection 110k to an edge portion of the partition plate 130 varies depending upon the circumferential or azimuthal direction or position, e.g. the distance d1 between the projection 110k and the edge of the partition plate 130 on the withdrawal opening 110g side is different from a distance d2 between the projection 110k and the edge of the partition plate 130 on the insertion opening 110f side is different (compare FIG. 28).

Preferably the edges of the partition plate 130 being in contact with the wiring harness D·W/H are rounded off for avoiding a damage to the wiring harness D·W/H, when the wiring harness D·W/H slides along the edge of the partition plate 130 due to the withdrawal thereof from the feeding or withdrawal opening 110f (e.g. by the opening of the door D).

What is claimed is:

1. A wiring harness arranging device for arranging a wiring harness between a first element and a second element that are movable with respect to each other about a hinge, said device comprising at least one wiring harness holder having an insertion opening and a dispensing opening in spaced-apart positions, the wiring harness being inserted through the insertion opening and dispensed through the dispensing opening, the wiring harness holder being fixed to a selected one of the first and second elements, such that a leading end of the wiring harness dispensed from the wiring harness holder through the dispensing opening is extended to the other of the first and second elements so that the wiring harness comes from and returns to the wiring harness holder according to the movement of the first and second elements with respect to each other the wiring harness holder comprising a guide frame having a substantially triangular shape with first, second and third apexes, the insertion opening being provided at the first apex thereof, the dispensing opening being provided at the second apex thereof, and the wiring harness being so accommodated in the guide frame as to extend in a non-linear manner toward the third apex for at least certain relative positions of said first and second elements.

2. A wiring harness arranging device according to claim 1, wherein the wiring harness is fixed to the holder at the insertion opening.

3. A wiring harness arranging device according to claim 1, wherein the wiring harness is inserted into the wiring harness holder through the insertion opening and dispensed or withdrawn through the dispensing opening after being arranged in a non-linear manner.

4. A wiring harness arranging device according to claim 1, wherein the wiring harness holder is fixedly and vertically accommodated in a recess formed in an end surface of the second element.

5. A wiring harness arranging device according to claim 1, wherein the at least one wiring harness holder has an open rear surface, and is formed with a locking claw detachably lockable with an engaging groove in the selected one of the first element and the second element, the wiring harness being slidably accommodated in a space defined between an open front surface of the wiring harness holder and the selected one of the first and second elements.

6. A wiring harness arranging device according to claim 5, wherein a tubular portion projects at least the insertion opening of the wiring harness holder and/or wherein, in particular the tubular portion of the insertion opening and the wiring harness are fixed by fixing means.

7. A wiring harness arranging device for arranging a wiring harness between a first element and a second element that are movable with respect to each other about a hinge, said device comprising at least one wiring harness holder having an insertion opening and a dispensing opening in spaced-apart positions, the wiring harness being inserted through the insertion opening and dispensed through the dispensing opening, the wiring harness holder being fixed to a selected one of the first and second elements, such that a leading end of the wiring harness dispensed from the wiring harness holder through the dispensing opening is extended to the other of the first and second elements so that the wiring harness comes from and returns to the wiring harness holder according to the movement of the first and second elements with respect to each other, the wiring harness arranging device further comprising a restricting tube having opposite ends, the wiring harness being passed through the restricting tube, one said end of the tube being at least partially placed inside the wiring harness holder in a position substantially continuous with the dispensing opening so as to be slidable in and out of the dispensing opening.

8. A wiring harness device according to claim 7, wherein:
the wiring harness holder comprises a guide frame having a substantially triangular shape with first, second and third apexes,
the insertion opening being provided at the first apex thereof,
the dispensing opening being provided at the second apex thereof, and
the wiring harness being so accommodated in the guide frame as to extend in a non-linear manner toward the third apex.

9. A wiring harness arranging device according to claim 7, wherein the wiring harness is fixed to the restricting tube so that the restricting tube moves together with the wiring harness, and wherein a biasing means is provided between the restricting tube and the wiring harness dispensing means to bias the wiring harness into the wiring harness holder.

* * * * *